United States Patent
Tashima et al.

(10) Patent No.: US 10,684,501 B2
(45) Date of Patent: Jun. 16, 2020

(54) MANUFACTURING SYSTEM AND MANUFACTURING METHOD

(71) Applicant: HIRATA CORPORATION, Kumamoto-shi, Kumamoto-ken (JP)

(72) Inventors: Akinori Tashima, Kumamoto (JP); Itsuo Fujiwara, Kumamoto (JP)

(73) Assignee: HIRATA CORPORATION, Kumamoto-Shi, Kumamoto-Ken (JP)

(*) Notice: Subject to any disclaimer, the term of this patent is extended or adjusted under 35 U.S.C. 154(b) by 0 days.

(21) Appl. No.: 15/912,782

(22) Filed: Mar. 6, 2018

(65) Prior Publication Data

US 2018/0275441 A1 Sep. 27, 2018

(30) Foreign Application Priority Data

Mar. 27, 2017 (JP) ................. 2017-061785

(51) Int. Cl.
*G02F 1/1333* (2006.01)
*C09J 7/29* (2018.01)
(Continued)

(52) U.S. Cl.
CPC ............ *G02F 1/13338* (2013.01); *B32B 7/02* (2013.01); *B32B 37/06* (2013.01); *B32B 41/00* (2013.01);
(Continued)

(58) Field of Classification Search
CPC .............. B32B 37/003; B32B 37/1284; B32B 38/1841; B32B 41/00; B32B 2457/202;
(Continued)

(56) References Cited

U.S. PATENT DOCUMENTS

2006/0162856 A1* 7/2006 Murayama ............ B29C 66/961 156/272.2
2009/0124158 A1* 5/2009 Hwang ................. B32B 38/162 445/24

FOREIGN PATENT DOCUMENTS

JP 5495845 B2 5/2014
JP 2016-008985 A 1/2016
(Continued)

OTHER PUBLICATIONS

Office Action dated Dec. 12, 2018, by the Taiwanese Patent Office in corresponding Taiwanese Patent Application No. 107106908. (4 pages).

*Primary Examiner* — George R Koch
(74) *Attorney, Agent, or Firm* — Buchanan Ingersoll & Rooney PC

(57) ABSTRACT

A manufacturing system for manufacturing a laminated body by coating a first panel with an adhesive in a first working region and bonding the first panel coated with the adhesive and a second panel in a second working region includes a first conveying device in the first working region for conveying the first panel and the second panel, a coating device in the first working region for coating, with the adhesive, the first panel, a bonding device in the second working region for bonding the first panel and the second panel, and a second conveying device in the second working region for conveying the first panel and the second panel to the bonding device. The first conveying device and the second conveying device convey the first panel and the second panel to be bonded to each other as a set.

14 Claims, 26 Drawing Sheets

(51) Int. Cl.
    *C09J 7/38*     (2018.01)
    *B32B 7/02*     (2019.01)
    *G02F 1/1337*     (2006.01)
    *B32B 37/06*     (2006.01)
    *G02F 1/1335*     (2006.01)
    *G02B 5/30*     (2006.01)
    *G06F 3/041*     (2006.01)
    *G02F 1/13357*     (2006.01)
    *B32B 41/00*     (2006.01)
    *B32B 7/14*     (2006.01)
    *B32B 37/12*     (2006.01)
    *B32B 37/00*     (2006.01)
    *B32B 38/18*     (2006.01)

(52) U.S. Cl.
    CPC . *C09J 7/29* (2018.01); *C09J 7/38* (2018.01); *G02B 5/3075* (2013.01); *G02F 1/1336* (2013.01); *G02F 1/133528* (2013.01); *G02F 1/133711* (2013.01); *G02F 1/133788* (2013.01); *G06F 3/0412* (2013.01); *B32B 7/14* (2013.01); *B32B 37/003* (2013.01); *B32B 37/1284* (2013.01); *B32B 38/1841* (2013.01); *B32B 2457/202* (2013.01); *C09J 2201/128* (2013.01); *C09J 2201/606* (2013.01); *C09J 2203/318* (2013.01); *G02F 2001/133322* (2013.01); *G06F 2203/04103* (2013.01)

(58) Field of Classification Search
    CPC ... B32B 37/06; B32B 7/02; B32B 7/14; C09J 2203/318; C09J 2201/128; C09J 2201/606; C09J 7/29; C09J 7/38; G02F 1/13338; G02F 2001/133322; G02F 1/133528; G02F 1/1336; G02F 1/133711; G02F 1/133788; G06F 2203/04103; G06F 3/0412; G02B 5/0375
    See application file for complete search history.

(56) References Cited

FOREIGN PATENT DOCUMENTS

| | | |
|---|---|---|
| KR | 10-2012-0133823 A | 12/2012 |
| TW | 201142410 A | 12/2011 |

\* cited by examiner

F I G. 11
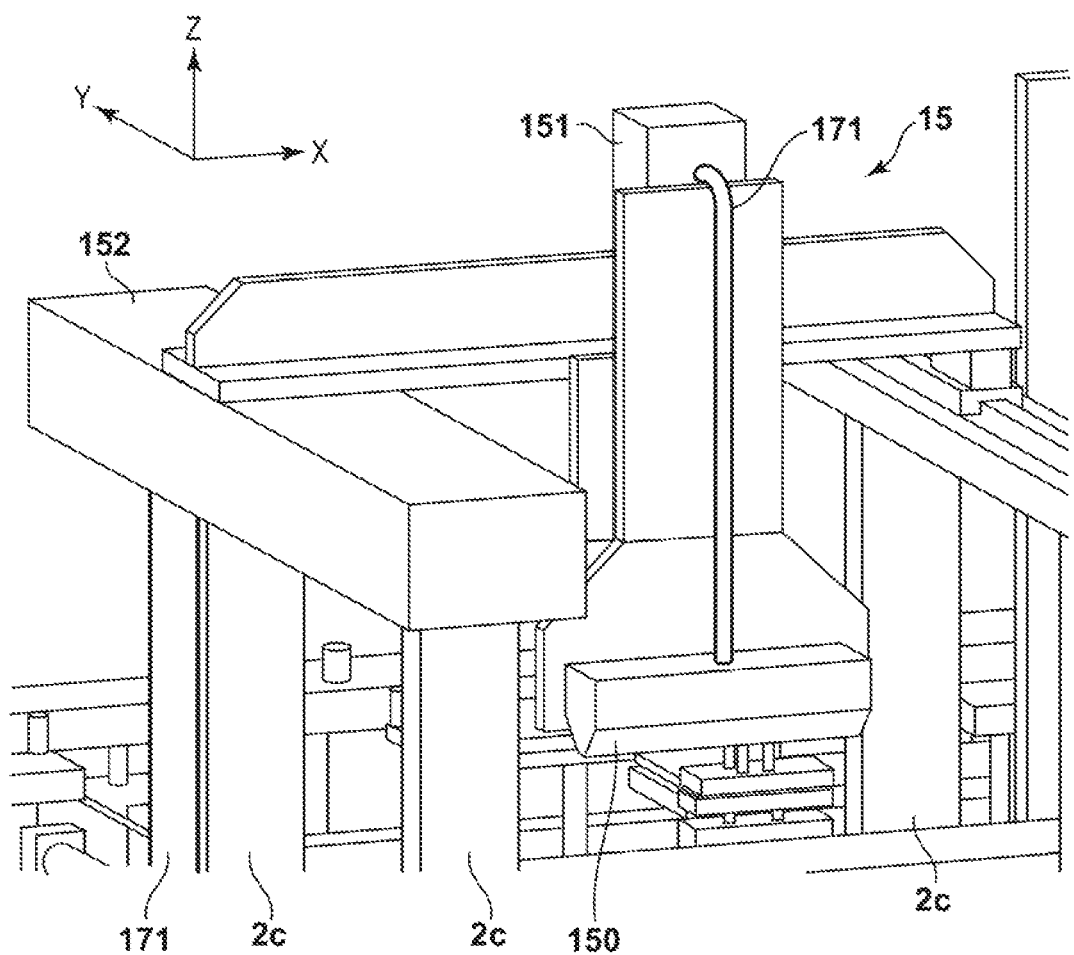

MANUFACTURING SYSTEM AND MANUFACTURING METHOD

BACKGROUND OF THE INVENTION

Field of the Invention

The present invention relates to a technique of manufacturing a laminated body obtained by bonding panels to each other.

Description of the Related Art

A liquid crystal display device or an organic EL display device is manufactured by bonding a cover panel which protects a display surface to a display panel. Japanese Patent Laid-Open No. 2016-008985 and Japanese Patent No. 5495845 propose systems as a system for manufacturing a laminated body by bonding two panels to each other. Japanese Patent Laid-Open No. 2016-008985 and Japanese Patent No. 5495845 each disclose a production line including a device for conveying one of the panels, a device for conveying the other of the panels, and a device for bonding the two panels to each other.

If an abnormality is found in one of the two panels before bonding during the process for manufacturing a laminated body, the abnormal panel is removed from the production line. If the numbers of panels prepared in advance are equal to each other, the numbers of panels are short or excessive. In addition, a combination of lot numbers of the two panels to be bonded to each other can vary. Therefore, the conventional system has room for improvement about the panel management.

SUMMARY OF THE INVENTION

The present invention provides a technique for facilitating management of two panels to be bonded to each other.

According to an aspect of the present invention, there is provided a manufacturing system for manufacturing a laminated body by coating a first panel with an adhesive in a first working region and bonding the first panel coated with the adhesive and a second panel in a second working region, comprising: a first conveying device arranged in the first working region and configured to convey the first panel and the second panel; a coating device arranged in the first working region and configured to coat, with the adhesive, the first panel conveyed by the first conveying device; a bonding device arranged in the second working region and configured to bond the first panel and the second panel; and a second conveying device arranged in the second working region and configured to convey the first panel and the second panel to the bonding device, wherein the first conveying device and the second conveying device convey the first panel and the second panel to be bonded to each other as a set.

According to another aspect of the present invention, there is also provided a manufacturing method for manufacturing a laminated body by coating a first panel with an adhesive in a first working region and bonding the first panel coated with the adhesive and a second panel in a second working region, comprising: a first conveying step of conveying the first panel and the second panel in the first working region; a coating step of coating, with the adhesive, the first panel conveyed by the first conveying step in the first working region; a second conveying step of conveying the first panel and the second panel in the second working region; and a bonding step of bonding the first panel and the second panel conveyed by the second conveying step in the second working region, wherein in the first conveying step and the second conveying step, the first panel and the second panel to be bonded to each other are conveyed as a set.

Further features of the present invention will become apparent from the following description of exemplary embodiments (with reference to the attached drawings).

BRIEF DESCRIPTION OF THE DRAWINGS

FIG. 11 is a view for explaining the supply device;

DESCRIPTION OF THE EMBODIMENTS

An embodiment of the present invention will be described with reference to the accompanying drawings. Arrows X, Y, and Z indicate directions perpendicular to each other. The arrow Z indicates the vertical direction (height direction), and the arrows X and Y indicate horizontal directions perpendicular to each other.

<Outline of System>

Figure 1:
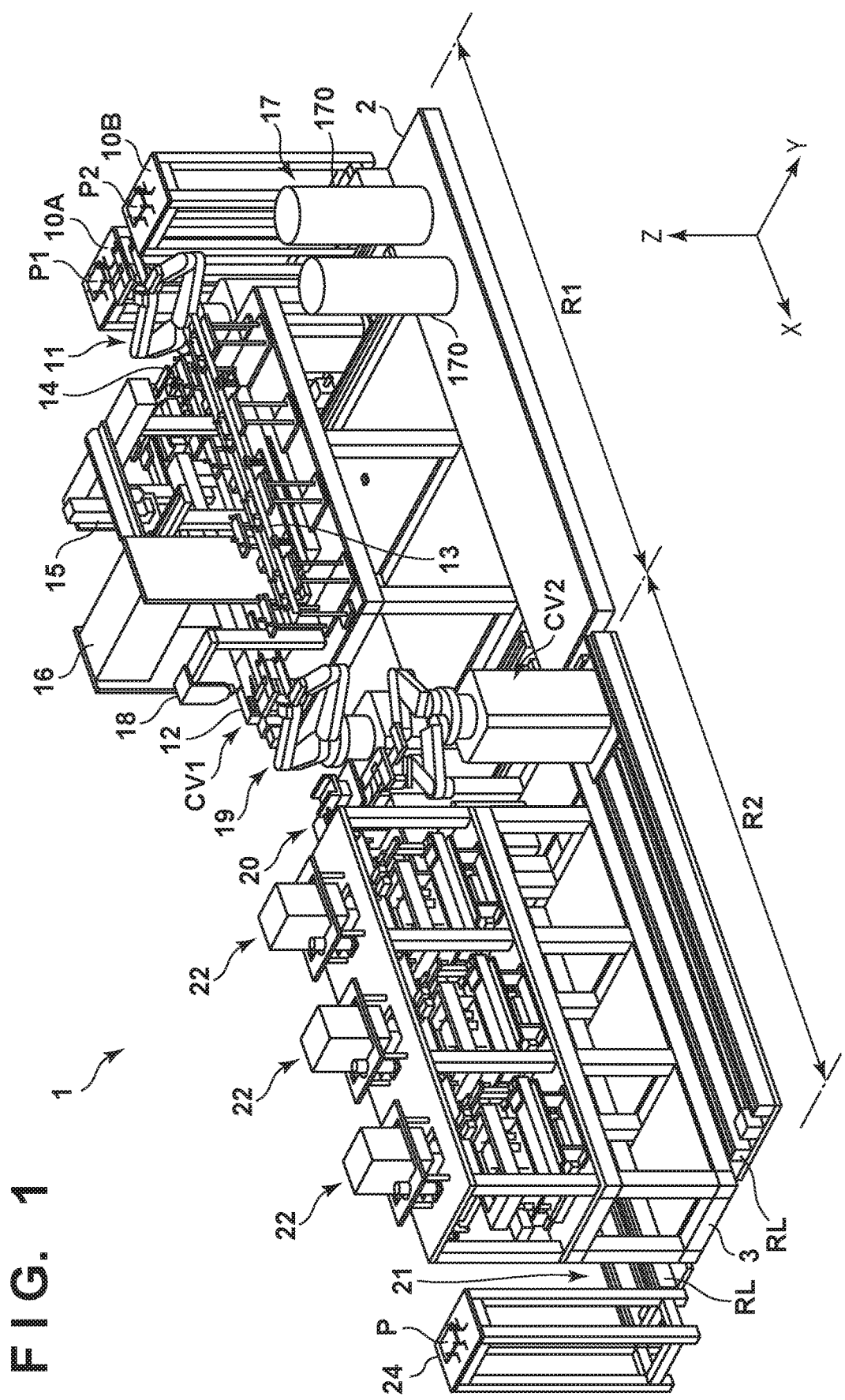
FIG. 1 is a perspective view of a manufacturing system according to an embodiment of the present invention.

FIG. 1 is a perspective view of a manufacturing system 1 according to an embodiment of the present invention. The manufacturing system 1 is a system for bonding two panels to manufacture a laminated body. The system of this embodiment is a system for bonding a liquid crystal display panel and its cover glass, but can be applied to a system for bonding panels of other types.

The arrangement of the manufacturing system 1 is divided into a first half working region R1 and a second half working region R2. Two panels to be bonded are conveyed almost in the X direction and are sequentially processed. In the following description, the upstream and downstream sides indicate the upstream and downstream sides in the panel conveyance direction when viewed in the X direction. In the working region R1, an operation for coating one panel with a coating solution is mainly performed. In the working region R2, the one panel coated with the coating solution is pasted to the other panel. The arrangements arranged in the working regions R1 and R2 will be sequentially described below.

<Working Region R1>

The arrangement arranged in the working region R1 will be described with reference to FIGS. 1 and 2. Input tables 10A and 10B in the working region R1 are juxtaposed to be spaced apart from each other in the Y direction. One panel P1 and the other panel P2 to be bonded to each other are conveyed from the preceding step and placed on the input tables 10A and 10B, respectively. In this embodiment, the panel P1 is a cover glass, and the panel P2 is a liquid crystal display panel. A plurality of pins extend upright on each of the input tables 10A and 10B. Each panel is placed on the plurality of pins.

A support member 2 is arranged in the working region R1. The support member 2 is a base for supporting each device arranged in the working region R1, and in this embodiment is arranged in the form of a frame body. A transfer device 11, a conveying device CV1, a measuring device 14, a coating device 15, an illumination device 16, and a transfer device 19 are arranged on the support member 2.

The transfer device 11 is arranged downstream of the input tables 10A and 10B, and the conveying device CV1 is arranged downstream of the transfer device 11. The transfer device 11 transfers the panels P1 and P2 from the input tables 10A and 10B to the conveying device CV1. Note that, more specifically, the panel P1 is transferred to the conveying mechanism 12 via the measuring device 14.

Figure 3:
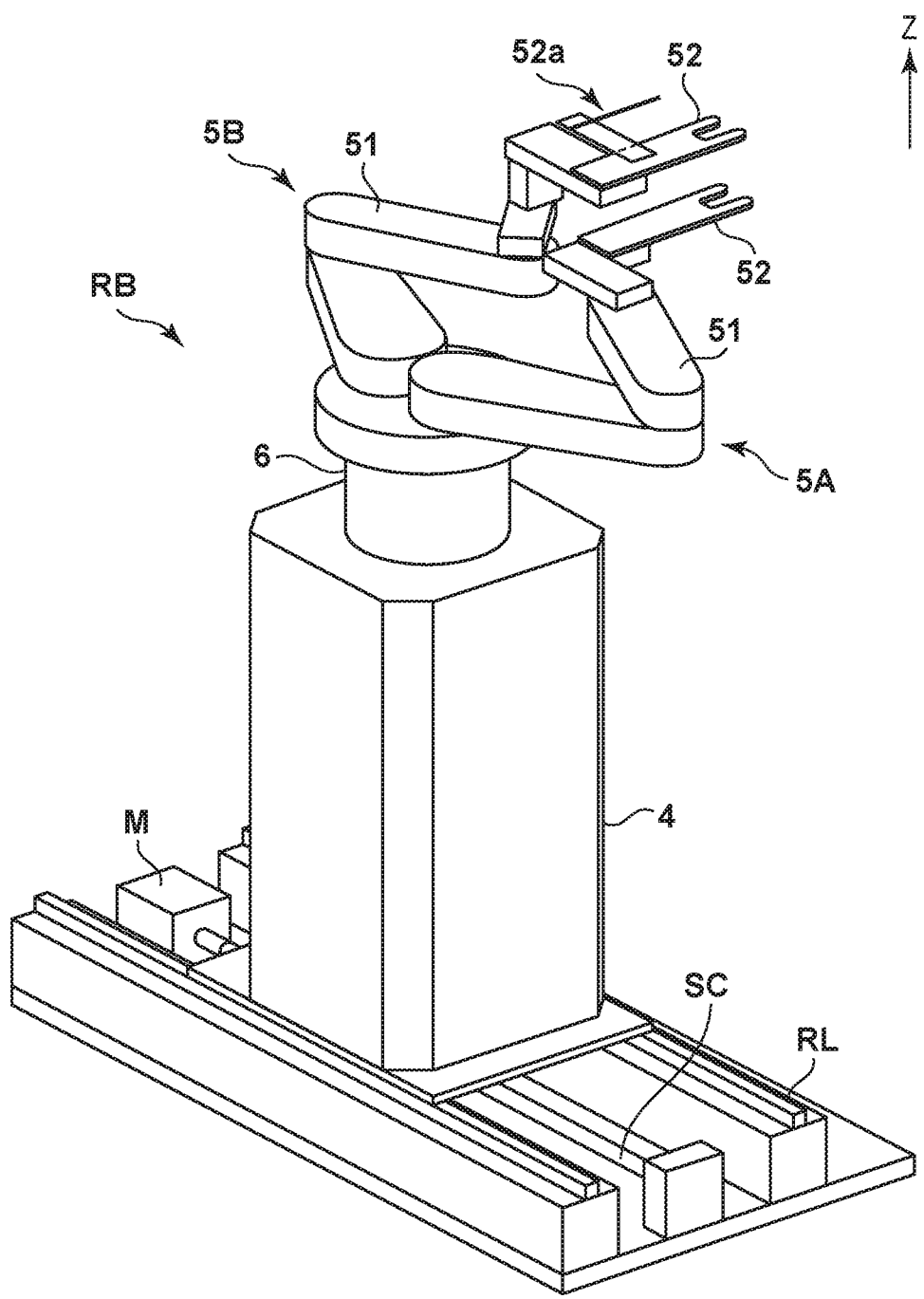
FIG. 3 is a perspective view of a transfer robot.

FIG. 3 is a perspective view of a transfer robot RB forming the transfer device 11. The transfer robot RB includes a moving unit 4, a pedestal unit 6, and holding units 5A and 5B mounted on the moving unit 4 via the pedestal unit 6. The moving unit 4 is engaged with rails RL and moves along the moving path by driving of a motor M (to be described later). As for the transfer device 11, the rails RL extend in the Y direction, and the moving path extends along the Y direction. In this embodiment, the moving unit 4 is connected to a ball nut engaging with a ball screw SC rotated using the motor M as the driving source. The ball screw SC extends along the Y direction, and the rails RL are arranged parallel to the ball screw SC. Upon rotation of the motor M, the moving unit 4 is moved reciprocally on the rails RL. The driving mechanism of the moving unit 4 is not limited to the ball screw mechanism, but can employ various driving mechanisms such as a rack-and-pinion mechanism. This also applies to each mechanism (to be described later) for moving any arrangement.

The moving unit 4 incorporates a driving mechanism for vertical movement of the pedestal unit 6 in the Z-axis direction and its rotation about the Z-axis. The holding units 5A and 5B are supported on the pedestal unit 6.

The holding unit 5A holds the panel P1, and the holding unit 5B holds the panel P2. In this embodiment, each of the holding units 5A and 5B is formed from an articulated arm and includes an arm portion 51 and a hand portion 52 arranged at the end portion of the arm portion 51. Each of the holding units 5A and 5B moves the hand portion 52 reciprocally in the horizontal direction to transfer the panel P1 or P2 placed on the hand portion 52. Chucking portions for chucking each panel are arranged on the upper and lower surfaces of the hand portion 52. The hand portion 52 of the holding unit 5A is located at a position lower than that of the hand portion 52 of the holding unit 5B. The pair of the panels P1 and P2 overlap (overlap when viewed from the top) in the Z direction in a parallel posture by the holding units 5A and 5B. In this embodiment, the panel P2 is the liquid crystal display panel which may include parts such as a cable. An accessory support portion 52a for supporting such an accessory part is arranged on the hand portion 52 of the holding unit 5B. Note that the accessory support portion 52a is arranged at a supportable position in accordance with the attachment position of the accessory part.

In this embodiment, the transfer robot RB is similarly used for a transfer device 19, a conveying device CV2, or a transfer device 24, all of which will be described later. As a matter of course, different mechanisms may be used for the respective devices.

Referring back to FIGS. 1 and 2, in this embodiment, the conveying device CV1 includes two conveying mechanisms 12 and 13. The conveying mechanism 12 conveys the panel P1, and the conveying mechanism 13 conveys (transfers) the panel P2. The pair of the panels P1 and P2 to be bonded to each other are conveyed parallel in the X direction by the conveying mechanisms 12 and 13. However, it is possible to convey the panels P1 and P2 by the conveying mechanisms 12. Both the panels P1 and P2 to be conveyed in a pair may undergo the coating process, and coating films to be applied may be the same type or different types. In addition, the panels P1 may be continuously conveyed by the conveying mechanism 12, and the panels P2 may be intermittently conveyed parallel at an equal pitch by the conveying mechanism 13, thereby conveying the pair of the panels P1 and P2 parallel in the X direction. As the conveying mechanism 13 for transferring the panels intermittently, a walking beam transfer device is enumerated.

Figure 4:
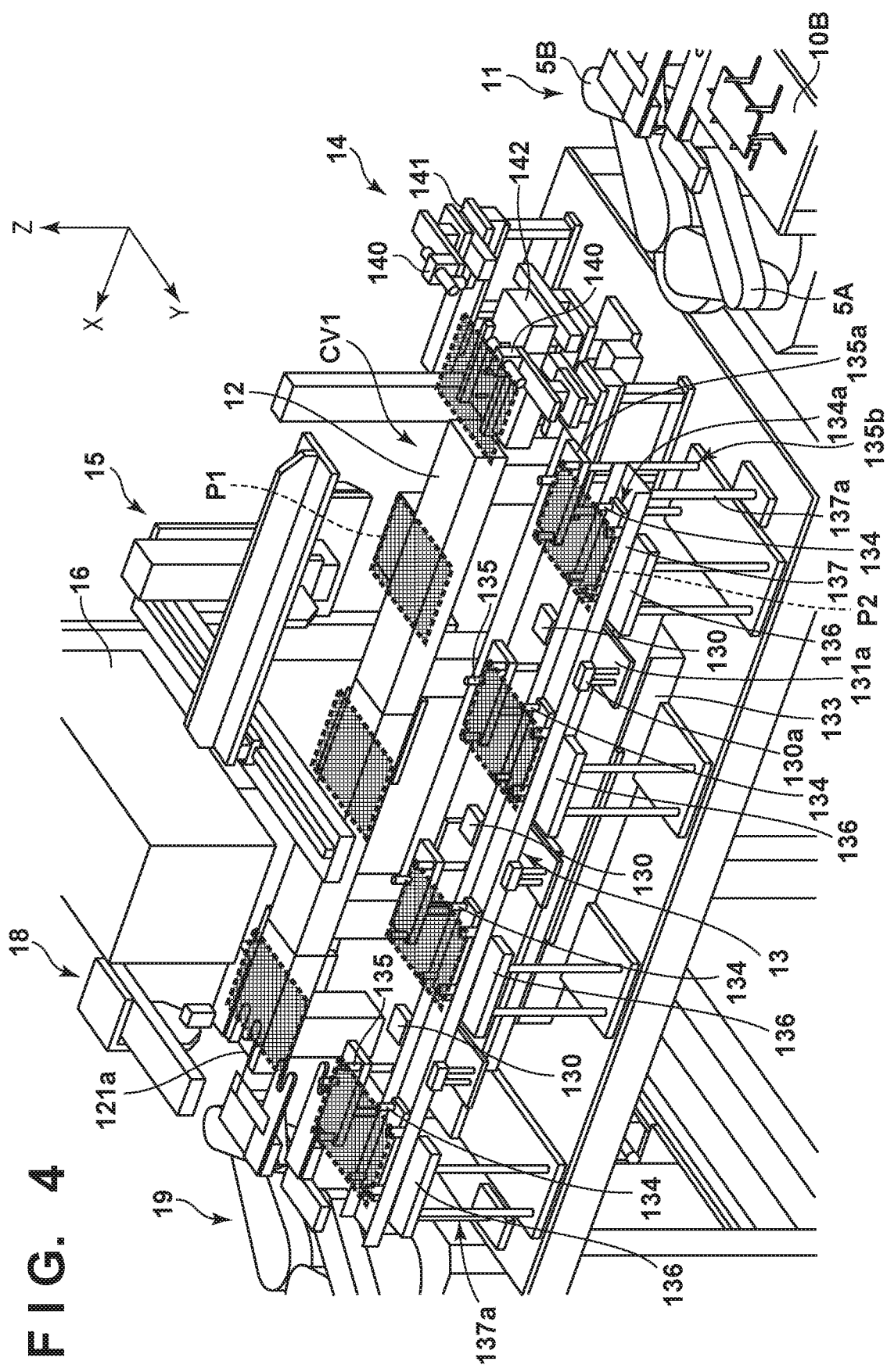
FIG. 4 is a perspective view of the periphery of a conveying device.

FIG. 4 is a view showing the conveyance modes of the panels P1 and P2 by the conveying device CV1 and its peripheral devices. Referring to FIG. 4, the panels P1 and P2 are illustrated in a size larger than the actual size to facilitate understanding of the conveyance modes. The arrangements of parts of the various devices are not illustrated.

The conveying mechanism 12 extends in the X direction. The conveying mechanism 13 extends parallel to the conveying mechanism 12 to be spaced apart from each other in the Y direction. These mechanisms will be described in detail later.

The measuring device 14 for measuring the thickness or the like of the panel P1, the coating device 15 for coating the panel P1 with the coating solution (in this embodiment, an adhesive used to bond the panels), the illumination device 16 for semi-curing the adhesive, and a measuring device 18 for measuring the film thickness of the adhesive are arranged on the conveyance path of the conveying mechanism 12. On the other hand, no processing device for the panel P2 is arranged on the conveyance path of the conveying mechanism 13. In this embodiment, processes for the panel P1 are mainly performed in the working region R1, and the panel P2 is set with the panel P1 and simply conveyed. As a matter of course, an arrangement for arranging a device for the panel P2 in the working region R1 may also employed. In this embodiment, an adhesive is enumerated as the coating solution, but the coating solution is not limited to the adhesive. Any coating solution can be used if it is applied by the coating device 15. The layout of the illumination device 16 is appropriately selected in accordance with the type of coating solution.

Figure 5:
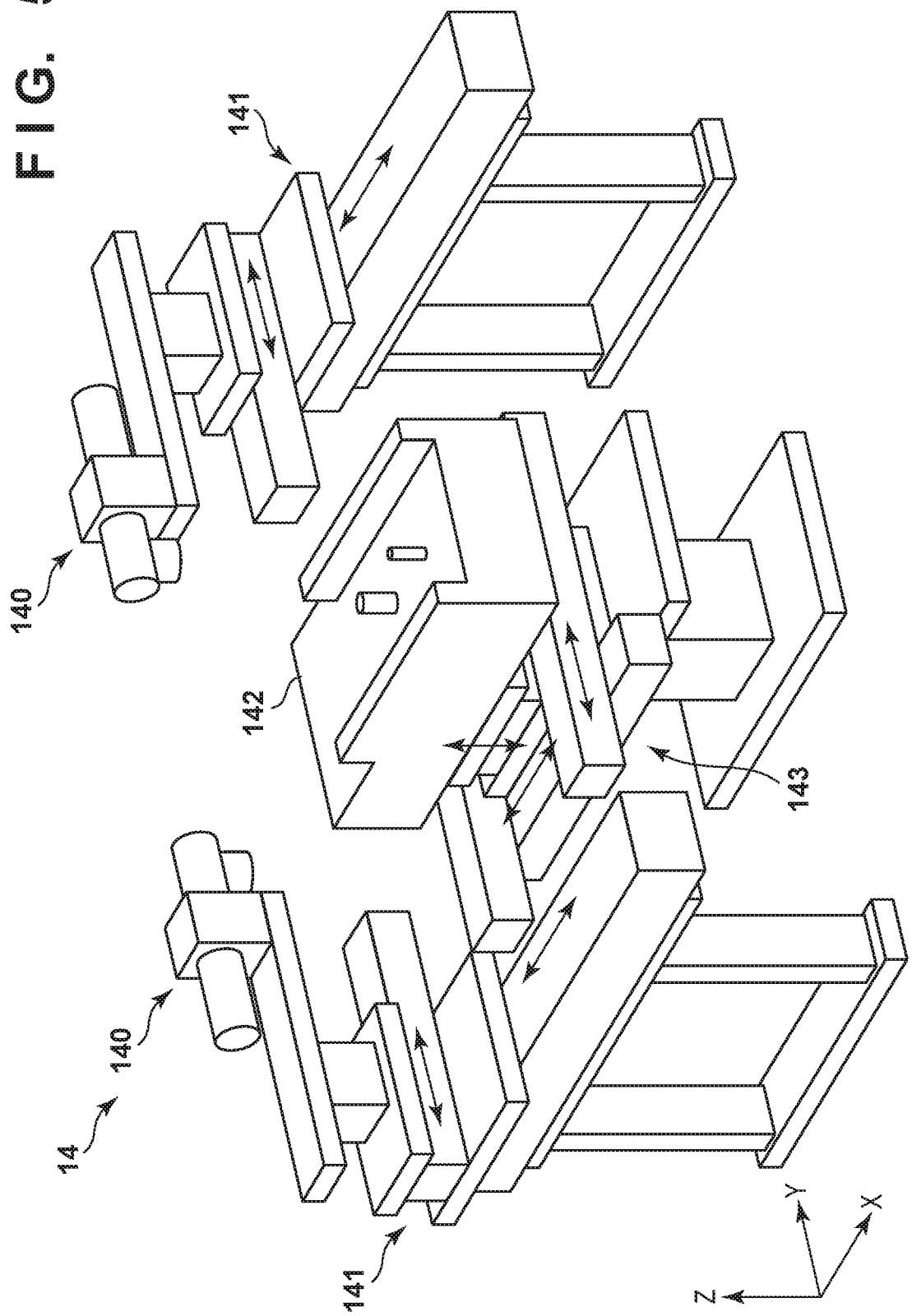
FIG. 5 is a perspective view of a measuring device.

The measuring device 14 is arranged at the upstream end of the conveying mechanism 12. FIG. 5 is a perspective view of the measuring device 14. The measuring device 14 includes a pair of shooting units 140, a pair of multiaxial sliders 141, a support base 142, and a multiaxial slider 143. The multiaxial sliders 141 and 143 may be, for example, an X-Y table, an arrangement obtained by combining a lifting shaft with the X-Y table, or an orthogonal coordinate robot.

The transfer device 11 transfers the panel P1 on the support base 142. The support base 142 includes a chucking portion for chucking the panel P1 and can hold the panel P1 in a horizontal posture. The multiaxial slider 143 can move the support base 142 in the X, Y, and Z directions. The multiaxial slider 143 performs the lifting operation of the support base 142 at the time of transfer of the panel P1 or a horizontal moving operation at the time of alignment of the panel P1.

The pair of shooting units 140 and the pair of multiaxial sliders 141 are juxtaposed to be spaced apart from each other in the Y direction. The support base 142 and the multiaxial slider 143 are arranged between one pair of shooting unit and multiaxial slider and the other pair of the shooting unit and multiaxial slider. Each shooting unit 140 includes a camera for shooting the panel P1 on the support base 142. Each multiaxial slider 141 can move the shooting unit 140 in the X and Y directions, thereby moving the shooting position of the shooting unit 140. The thickness of the panel P1 and the position (posture) on the support base 142 are measured by the shot image of each shooting unit 140.

Based on the measurement results, a controller (to be described later) calculates the position correction value of the panel P1. The controller controls the multiaxial slider 143 based on the calculation value, thereby finely adjusting the position of the support base 142. The panel P1 is aligned at the correct position (posture) with respect to the coating device 15. When alignment of the panel P1 is performed in advance, the accuracy of the adhesive coating operation in the subsequent coating device 15 can be improved. In addition, panels different in sizes and thicknesses can also be handled.

Figure 6:
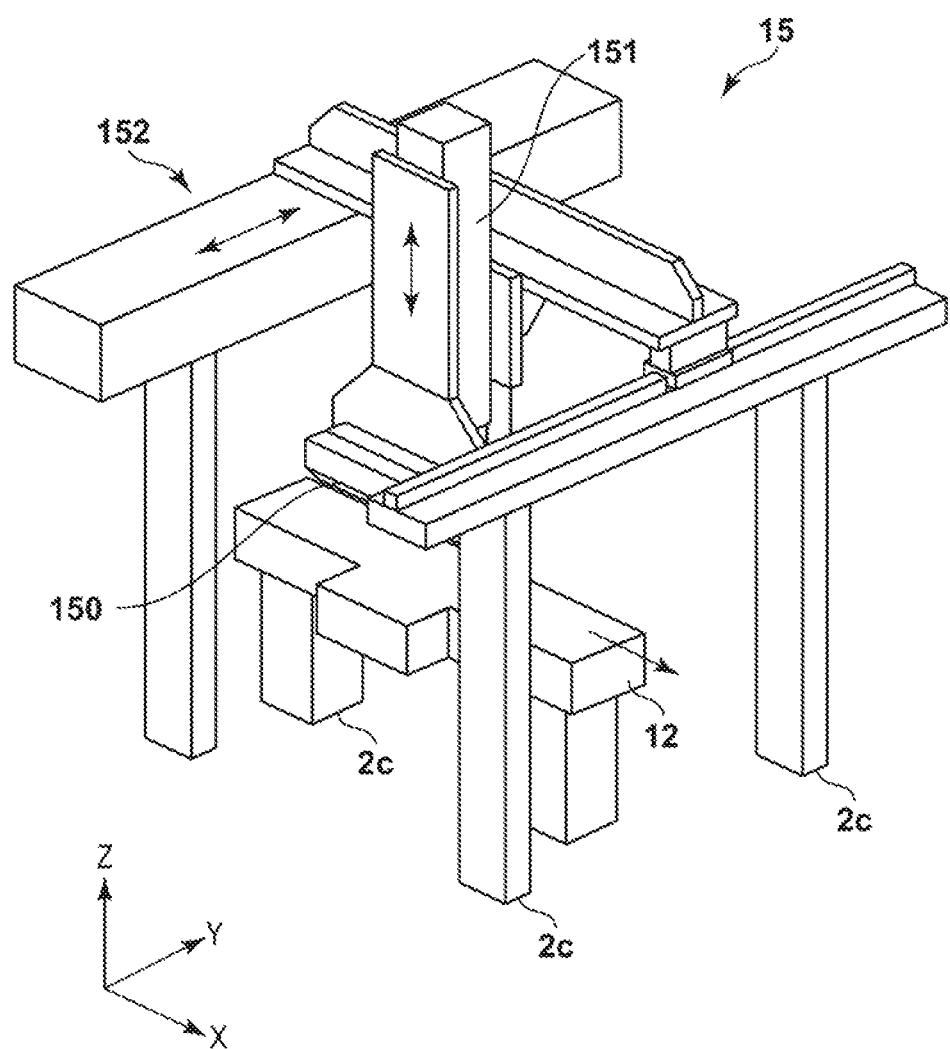
FIG. 6 is a perspective view of a coating device.

The coating device 15 is arranged downstream of the measuring device 14. FIG. 6 is a perspective view of the coating device 15. The coating device 15 includes a coating head 150, a lifting mechanism 151, and a horizontal moving mechanism (Y-direction moving mechanism) 152. The coating head 150 has a slot-like discharge port extending in the X direction and discharges the adhesive on the panel P1 from above. In this embodiment, the adhesive is a photo-curable resin (OCR) to be cured upon ultraviolet irradiation. The lifting mechanism 151 moves the coating head 150 in the Z direction. The horizontal moving mechanism 152 moves the lifting mechanism 151 in the Y direction. The coating head 150 can be moved in the Z-Y plane by the lifting mechanism 151 and the horizontal moving mechanism 152.

In this embodiment, the discharge port (possible adhesive coating range) of the coating head 150 has a length equal to or larger than the X-direction width of the panel P1. When the horizontal moving mechanism 152 moves the coating head 150 from one end to the other end of the panel P1 in the Y direction, the predetermined range of the surface of the panel P1 is coated with the adhesive in the form of a film. Since the coating head 150 is moved not in the conveyance direction (X direction) but in the Y direction perpendicular to the conveyance direction, the coating head 150 is moved to a working position (not shown) set in the peripheral portion of the working region R1 in the Y direction (widthwise direction of the conveying mechanism 12) during the maintenance such as replacement of the coating head 150, thereby facilitating the maintenance operation.

A detection sensor (not shown) arranged on the coating device 15 detects the panel surface of the panel P1. Based on the detection result, a controller (to be described later) controls the height of the coating head 150 with respect to the surface of the panel P1 by the lifting mechanism 151 and the moving speed of the coating head 150 by the horizontal moving mechanism 152. Accordingly, the thickness of the adhesive film is controlled, and the panel surface of the panel P1 is coated with the adhesive film having a predetermined film thickness. When adjusting the height of the coating head 150, the measurement result of the thickness of the panel P1 measured by the measuring device 14 can be utilized, and the measurement result serves as one of the film thickness control parameters.

Figure 2:
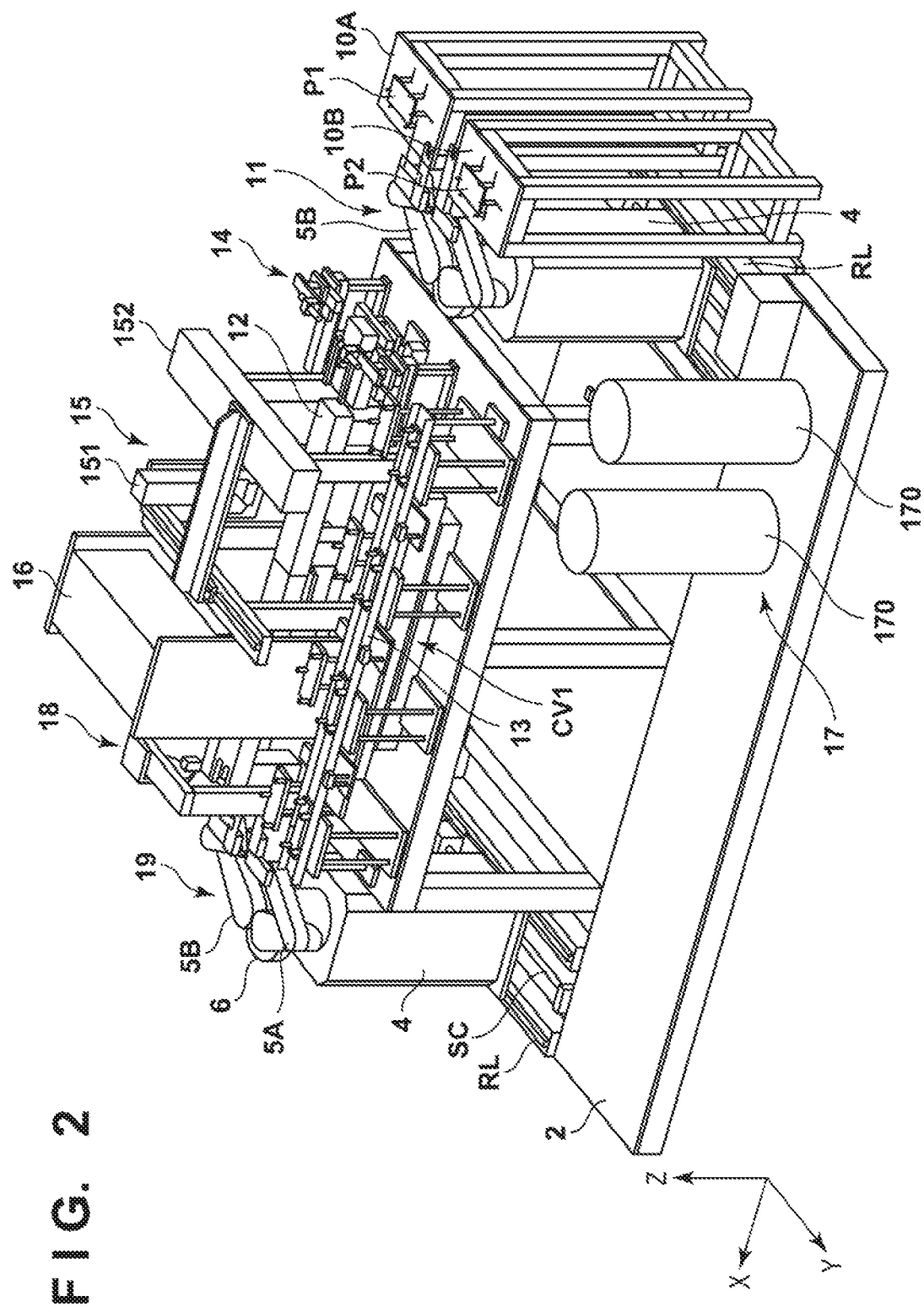
FIG. 2 is a perspective view showing the schematic arrangement of the first half portion of the manufacturing system shown in FIG. 1.

Referring to FIGS. 2 and 4, the illumination device 16 is arranged downstream of the coating device 15. The illumination device 16 includes an illumination unit for illuminating the panel P1 with ultraviolet rays from above. The panel P1 whose surface is coated with the adhesive film is irradiated with the ultraviolet rays when the panel P1 passes under the illumination device 16, thereby semi-curing the adhesive. In this case, semi-curing is set to an extent that the viscosity of the adhesive is maintained, and dripping of the adhesive is suppressed. The degree of semi-curing can be adjusted by the intensity of the ultraviolet rays and the irradiation time.

Figure 7:
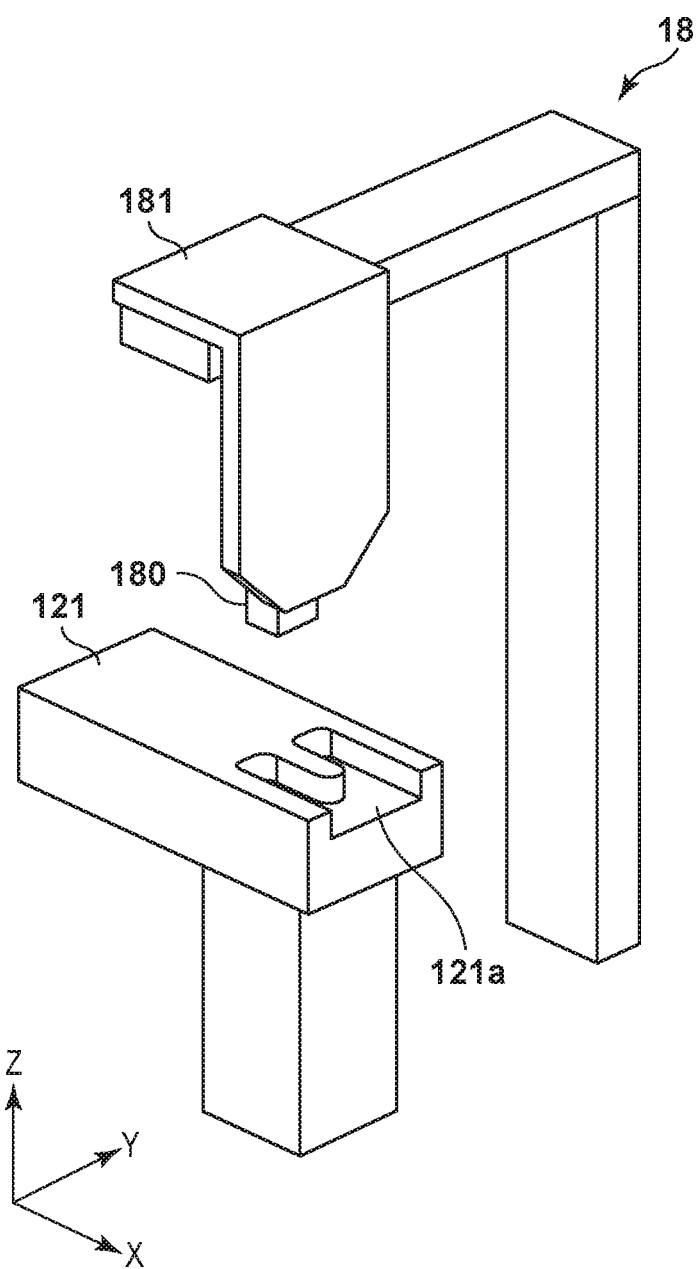
FIG. 7 is a perspective view of the measuring device.

The measuring device 18 is arranged downstream of the illumination device 16. FIG. 7 is a perspective view of the measuring device 18. The measuring device 18 includes a measuring unit 180 such as a laser range finder and a support unit 181 for supporting the measuring unit 180 above the panel P1. The support unit 181 supports the measuring unit 180 such that the measuring unit 180 is maintained at a predetermined height with respect to the support member 2 (or a support unit 121). The measuring device 18 measures the film thickness of the adhesive. If the film thickness falls outside the predetermined range, the panel is regarded as a defective panel. The film thickness measurement can be performed as follows. For example, the heights of coated and non-coated regions of the adhesive on the surface of the panel P1 are measured, and the difference between the measurement values can be defined as the film thickness. Alternatively, the heights of the coated region of the adhesive and the surface of the support unit 121 may be measured, and the difference between the thickness of the panel P1 measured by the measuring device 14 and the difference between the measurement values may be defined as the film thickness.

The arrangements of the conveying mechanisms 12 and 13 and the conveying operation of the conveying mechanism 13 will be described with reference to FIGS. 4, 8, and 9.

Figure 8:
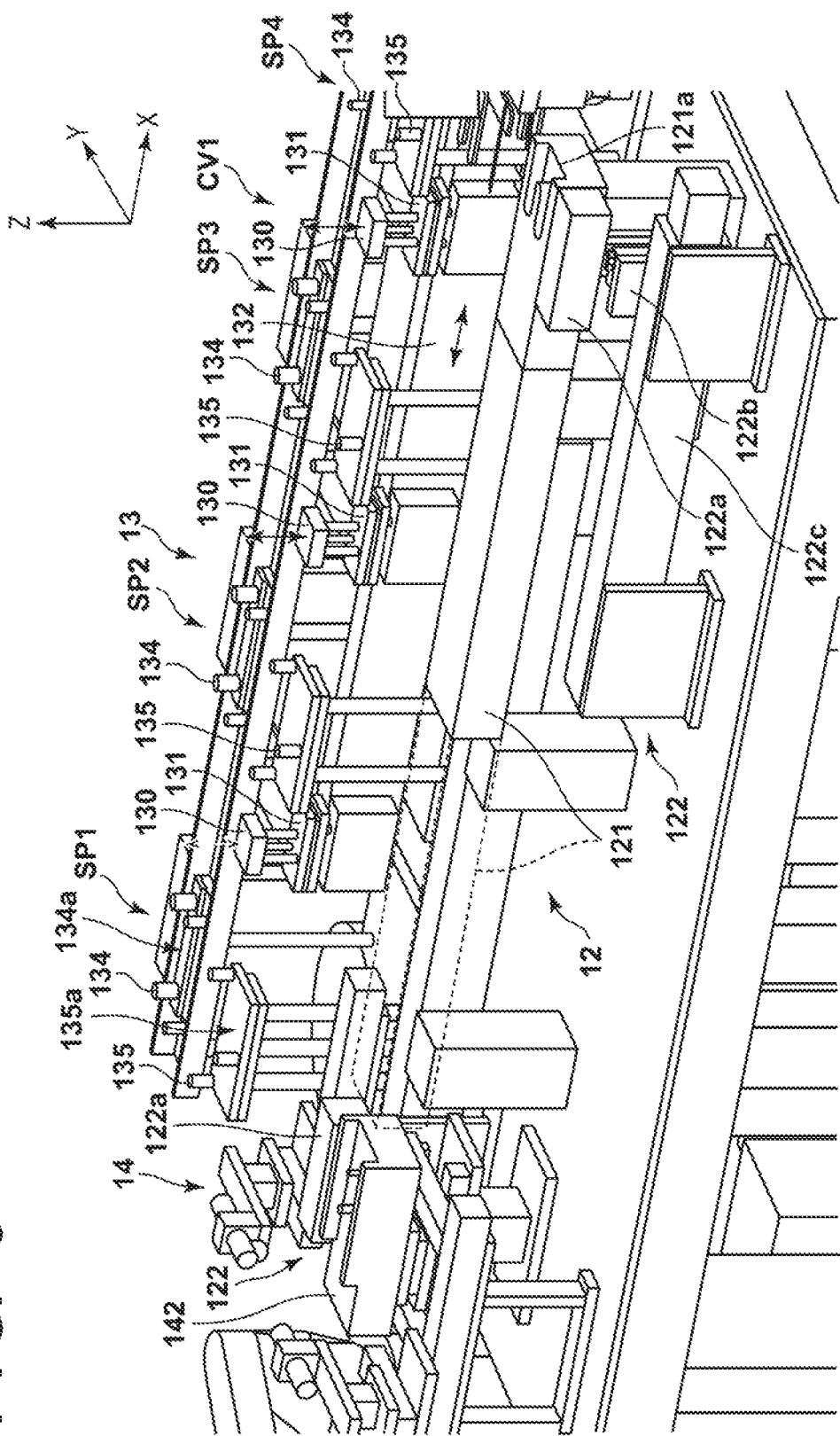
FIG. 8 is a perspective view of the conveying device.

Referring to mainly FIG. 8, the conveying mechanism 12 includes the support unit 121 for supporting the panel P1 in a floating state and a plurality of chucking moving units 122 for chucking and moving the panel P1. The support unit 121 has an upper surface extending in the X direction and supports the panel P1 in a slightly floating state by spraying air from a plurality of holes formed in the upper surface. In this embodiment, the chucking moving units 122 are arranged such that one chucking moving unit 122 is arranged on each of the two side portions of the support unit 121 (a total of two chucking moving units 122). A recess 121*a* is formed in the upper surface at the downstream end of the support unit 121. At the time of unloading the panel P1, the hand portion 52 of a transfer device 19 (to be described later) is fitted in the recess 121*a*.

Each chucking moving unit 122 includes a chucking unit 122*a*, a lifting mechanism 122*b*, and a moving mechanism 122*c*. The chucking unit 122*a* has the upper surface serving as a chucking surface for chucking the panel P1. For example, a plurality of holes open to the chucking surface are formed, and air is drawn via the plurality of holes, thereby chucking the panel P1 on the upper surface of the chucking unit 122*a*. The lifting mechanism 122*b* moves the chucking unit 122*a* in the Z direction. The moving mechanism 122*c* moves the lifting mechanism 122*b* in the X direction.

In this embodiment, the two chucking moving units 122 are used to convey the panel P1. Out of these two units, one conveys the panel P1 from the measuring device 14 (upstream end) to the illumination device 16, and the other conveys the panel P1 from the illumination device 16 to the measuring device 18 (downstream end).

The conveying operation will be described below. When the chucking unit 122*a* is located at a position lower than the upper surface of the support unit 121, the moving mechanism 122*c* lifts the chucking unit 122*a* toward the lower surface of the panel P1. When the lifting mechanism 122*b* lifts the chucking unit 122*a* to a position contacting the lower surface of the panel P1, the chucking unit 122*a* chucks the lower surface of the panel P1, so that the chucking unit 122*a* holds the panel P1. Subsequently, when the moving mechanism 122*c* moves the chucking unit 122*a* to the downstream side, the panel P1 is conveyed in the X direction. Since the support unit 121 supports the panel P1 in a floating state during conveyance of the panel P1, the panel P1 can be conveyed smoothly in a noncontact state. When the panel P1 reaches the target position, the moving mechanism 122*c* is stopped to stop spraying the air by the support unit 121. After that, the lifting mechanism 122*b* moves the chucking unit 122*a* downward to place the panel P1 on the surface of the support unit 121. The chucking of the panel P1 by the chucking unit 122*a* is released.

The conveying mechanism 12 conveys the plurality of panels P1 in the X direction. Four stop positions are set as indicated by SP1 to SP4 in the X direction, as shown in FIG. 8. The stop position SP1 is the upstream end position which is the position of the panel P1 on the support base 142 of the measuring device 14. The stop position SP4 is a downstream end position which is the unloading position of the panels P1 and P2 from the conveying device CV1 and the film thickness measurement position of the panel P1 of the measuring device 18.

The stop positions SP2 and SP3 are intermediate positions between the stop positions SP1 and SP4. The stop position SP2 is the position where the panel P1 is coated with the adhesive by the coating device 15. The stop position SP3 is the position where the panel P1 is irradiated with ultraviolet rays by the illumination device 16. In this embodiment, the intervals of the stop positions SP1 to SP4 are equal to each other.

The conveying mechanism 13 will be described below. The conveying mechanism 13 includes a plurality of mounting tables 130, a lifting mechanism 131, a movable plate 132, and a driving mechanism 133. The panel P2 is placed on each mounting table 130. In this embodiment, the panel P2 is the liquid crystal display panel which may include parts such as a cable. The conveying mechanism 13 includes an accessory support portion 130*a* for supporting such an accessory part. The lifting mechanism 131 moves, in the Z direction, the mounting tables 130 and a lifting support plate 131*a* which supports the accessory support portion 130*a*. The movable plate 132 extends in the X direction and is supported by a driving mechanism 133 (to be described later) to be movable in the X direction. The lifting mechanism 131 is supported on the movable plate 132. In this embodiment, there are provided three sets of the mounting tables 130 and the lifting mechanisms 131. These sets are supported by the movable plate 132 at an equal interval in the X direction. Each driving mechanism 133 moves the movable plate 132 in the X direction.

Figure 9:
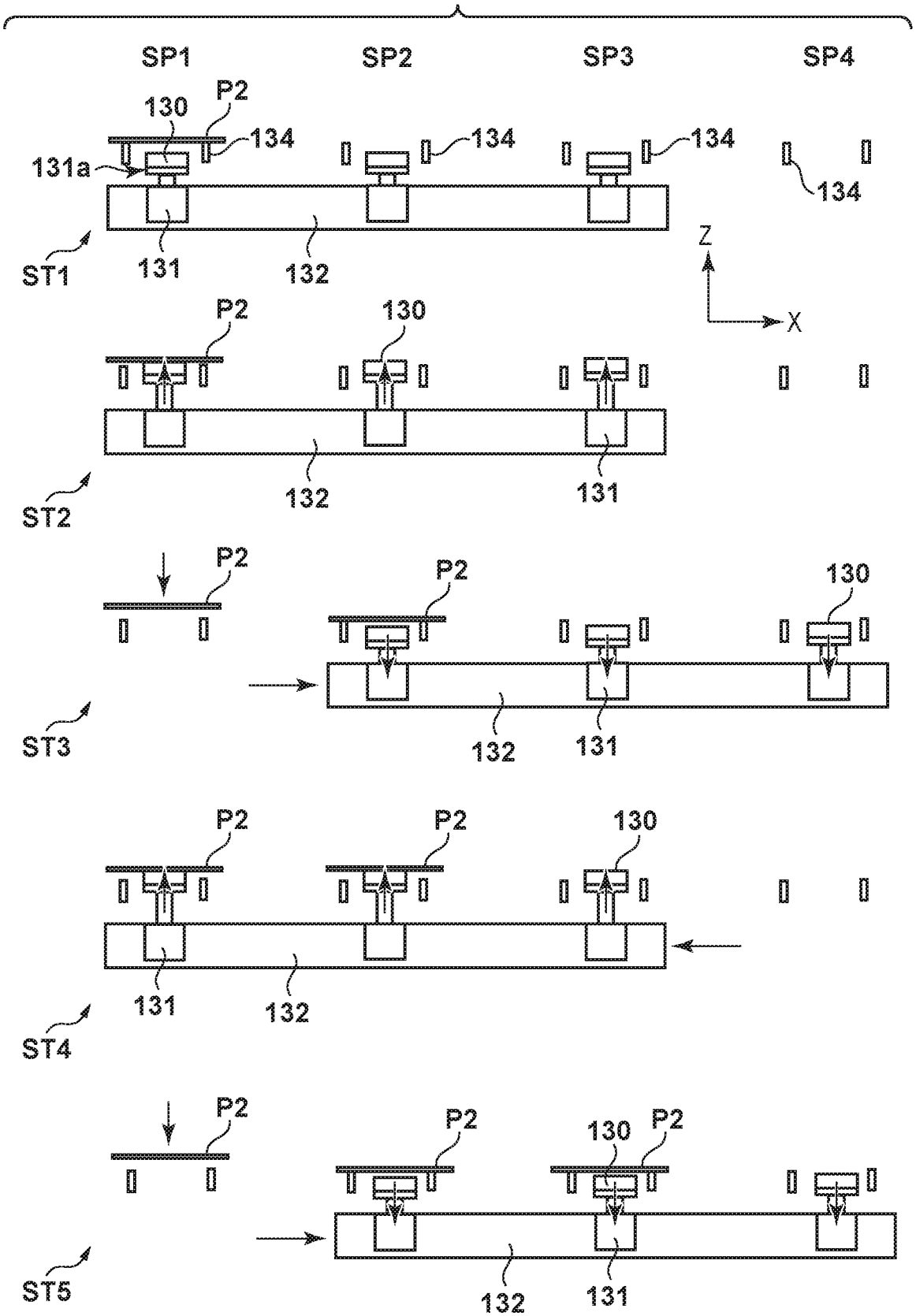
FIG. 9 is a view for explaining a conveying operation.

As shown in FIG. 9, the panel P2 is stopped at each of the stop positions SP1 to SP4 when viewed from the front in the Z-X plane. The panels P2 are sequentially simply conveyed and need not be primarily stopped. In order to clarify the panel P2 corresponding to the panel 1 and facilitate monitoring of the conveyance state, the panel P2 is also stopped at each of the stop positions SP1 to SP4 in correspondence with the stop of the panel P1. For this purpose, the conveying mechanism 13 includes a plurality of pin-like mounting members 134 and 135 at each of the stop positions SP1 to SP4. The pin-like mounting members 134 and 135 are formed into pin mounting plates 134*a* and 135*a* whose pins are attached at predetermined positions. The pin mounting plates 134*a* are supported at a predetermined interval in the conveyance direction on a mounting plate support member 137 extending in the conveyance direction of the conveying mechanism 13. The one-end portion and the other-end portion of the mounting plate support member 137 are supported by a pair of columnar members 137*a* provided on the support member 2. The pin mounting plates 135*a* are supported by columnar members 135*b* which support the pin mounting plates 135*a* to be spaced apart from the support member 2.

In this embodiment, the panel P2 is a liquid crystal display panel and may include accessory parts such as a cable. The conveying mechanism 13 includes an accessory support portion 136 for supporting such an accessory part. The accessory support portions 136 are made of plate-like members and supported by columnar members 136*a* which support the accessory support portions 136 to be spaced apart from the support member 2. Each mounting table 130 is positioned between the corresponding mounting members 134 and the corresponding pin-like mounting member 135, and each accessory support portion 130*a* is positioned between the corresponding mounting member 134 and the corresponding accessory support portion 136 when viewed in the Y direction. Each lifting support plate 131*a* disposed between the support member 2 and the corresponding mounting plate support member 137 is arranged to be movable in the conveyance direction and the lifting direction by the conveying mechanism 13.

FIG. 9 is a view for explaining the operation of the conveying mechanism 13. A state ST1 indicates a state in which the transfer device 11 transfers the panel P2 onto the mounting members 134 (and the mounting members 135 (not shown)) at the stop position SP1. The mounting tables 130 are located at the stop positions SP1 to SP3 lower than the panel P2. The lifting mechanisms 131 are extended to move the lifting support plates 131*a* upward, thereby lifting the mounting tables 130. As shown in a state ST2, the panel P2 mounted on the mounting members 134 at the stop position SP1 is scraped by the mounting table 130 and transferred onto the mounting table 130. As shown in a state ST3, when the movable plate 132 is moved in the X direction by the driving mechanism 133, the mounting tables 130 are located at the stop positions SP2 to SP4, respectively. After that, when the lifting mechanisms 131 are contracted to move the corresponding mounting tables 130 downward, the panel P2 is transferred from the mounting table 130 at the stop position SP1 to the mounting members 134 (and the mounting members 135 (not shown)) at the stop position SP2. At this time (see FIG. 4), the transfer device 11 loads the next panel P2 to the stop position SP1, and this panel P2 is transferred from the transfer device 11 to the mounting members 134.

As shown in a state ST4, the driving mechanism 133 moves the movable plate 132 to the original position in the X direction, and the mounting tables 130 are located at the stop positions SP1 to SP3, respectively. After that, the lifting mechanisms 131 are extended again to move the mounting tables 130 upward. Accordingly, the panel P2 at the stop position SP1 and the panel P2 at the stop position SP2 are transferred to the corresponding mounting tables 130. As shown in a state ST5, when the driving mechanism 133 moves the movable plate 132 in the X direction, the mounting tables 130 are located at the stop positions SP2 to SP4, respectively. After that, the lifting mechanisms 131 are contracted to move the mounting tables 130 downward, so that the panels P2 are transferred from the mounting tables 130 to the mounting members 134 at the stop positions SP2 and SP3. At this time, the transfer device 11 loads the next panel P2 to the stop position SP1 and transfers it to the mounting members 134. By repeating the above operation, the plurality of panels P2 are transferred intermittently at the equal interval. The operation start timing of the conveying mechanism 13 starts upon conveyance of the panel P1 serving as one panel to be paired to be bonded, and the panel P2 is conveyed.

Referring to FIGS. 1 and 2, the transfer device 19 is arranged downstream of the conveying device CV1. The transfer device 19 is formed from the transfer robot RB shown in FIG. 3. The rails RL extend in a direction (the Y direction in this embodiment) perpendicular to the conveyance direction of the panels P1 and P2. The transfer robot RB transfers, to a relay unit 20 of the working region R2 (to be described later), the panel P1 conveyed by the conveying mechanism 12 and the panel P2 transferred by the conveying mechanism 13. To remove the panel P1 from the conveying mechanism 12, the hand portion 52 of one holding unit 5A is inserted into the recess 121a to scrape the panel P1 from the support unit 121, thereby removing the panel P1. To remove the panel P2 from the conveying mechanism 13, the hand portion 52 of the other holding unit 5B scrapes, from below, the panel P2 placed on the mounting members 134 and 135 at the stop position SP4, thereby removing the panel P2.

Figure 10:
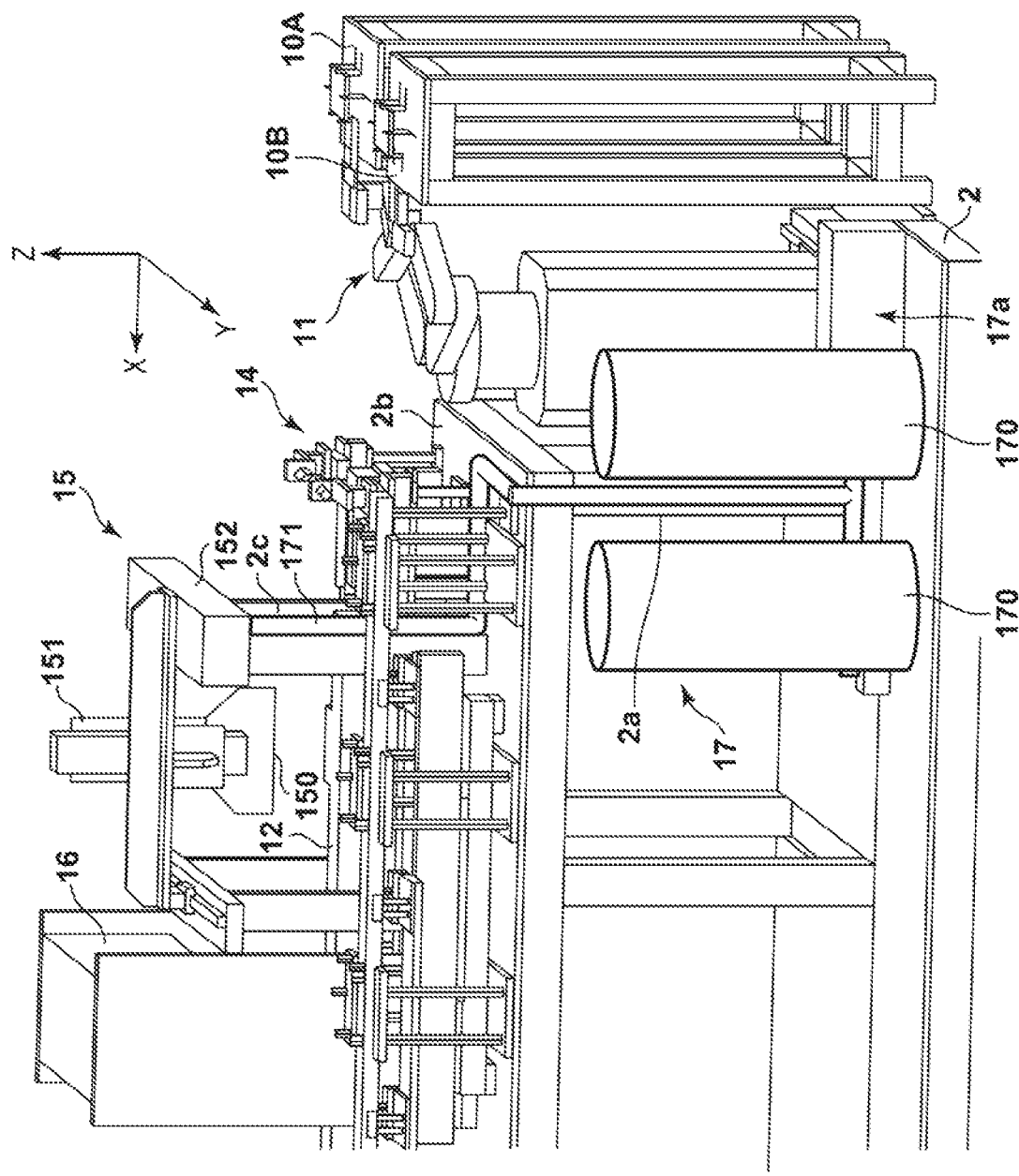
FIG. 10 is a view for explaining a supply device.

A supply device 17 for supplying an adhesive to the coating device 15 will now be described with reference to FIGS. 10 and 11. The supply device 17 includes storing portions 170, a supply path 171, and a supply pump 17a. The storing portions 170 are tanks which store the adhesive. The supply path 171 is an adhesive supply path (pipe) between the storing portions 170 and the coating head 150. The supply pump 17a is operated to supply the adhesive from the storing portions 170 to the coating head 150 via the supply path 171. The storing portions 170, the supply path 171, and the supply pump 17a are supported by the support member 2. The supply path 171 is supported by a plurality of portions such as a plurality of leg portions 2a of the support member 2, a table portion 2b supported by the plurality of leg portions 2a, and columns 2c which support the coating device 15. The coating device 15 is supported by the table portion 2b. The common support member 2 supports the coating device 15 and the supply device 17 at predetermined support positions to decide the positional relationship between the coating device 15 and the storing portions 170 and the path of the supply path 171 connected between them to supply the adhesive, thereby setting the predetermined length of the supply path.

The panel P1 serving as a coating target by the coating device 15 is coated by adjusting the coating rate, the coating height, and the coating amount in accordance with the viscosity of the adhesive and the environment around the coating process and setting optimal coating conditions. In the coating condition setting, since the supply path is set in the predetermined length, the setting management of the optimal coating conditions can be facilitated. In addition, when the coating device 15 and the supply device 17 are arranged at the predetermined positions of the common support member 2, and the supply path 171 is arranged on the common support member 2, the entire apparatus can be moved while maintaining the relationship between the coating device 15, the supply device 17, and supply path 171. The apparatus is not affected by a change in layout of a factory. The coating conditions can be maintained even after the layout change, thereby facilitating the coating management. In addition, if maintenance such as the replacement of the storing portions 170, the replacement of the pipe of the supply path 171, and the replacement of the coating head 150 is required, the positioning operation and the coating condition setting operation after the replacement can be facilitated because the layout positions are already determined, thereby improving the maintenance.

<Working Region R2>

Figure 12:
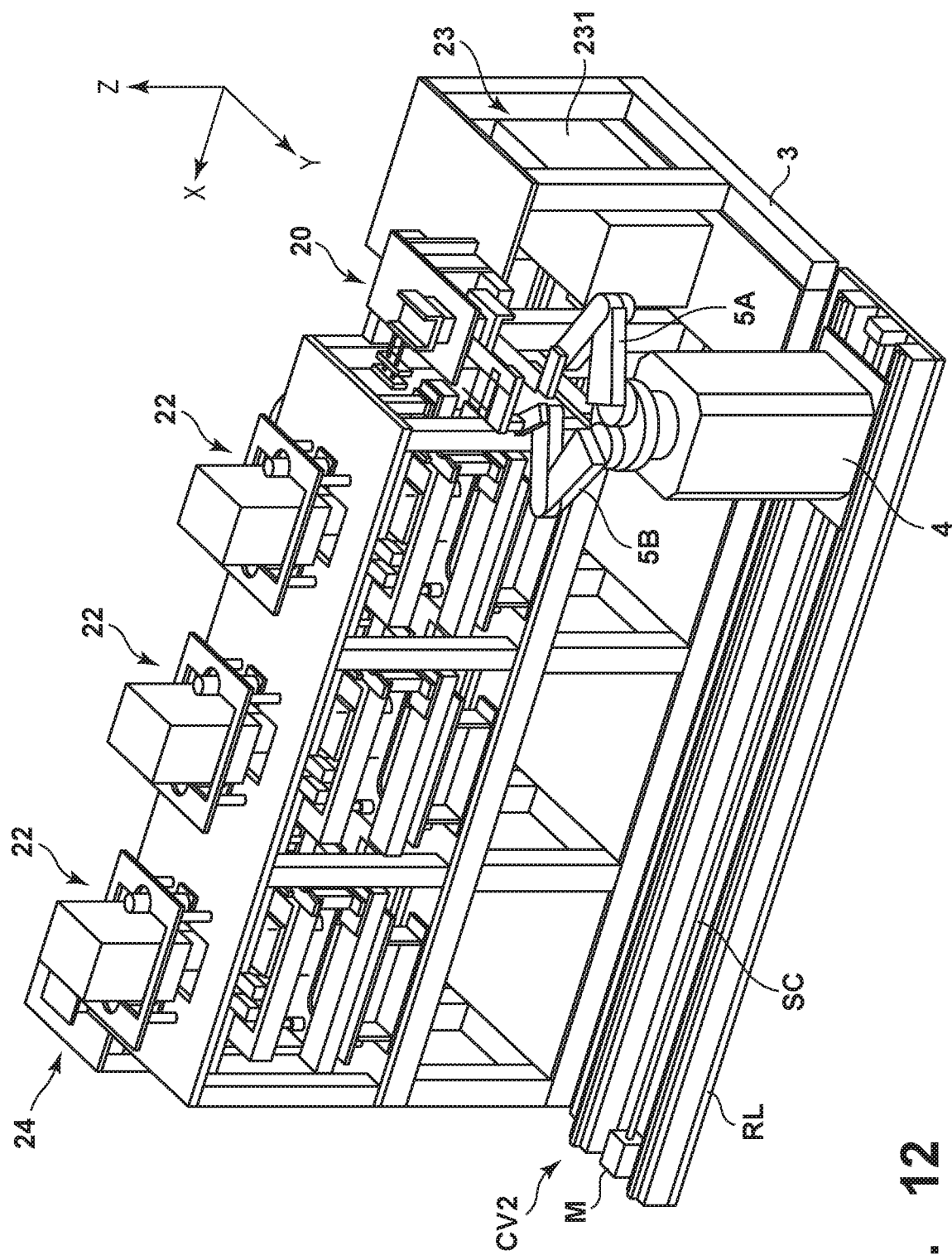
FIG. 12 is a perspective view showing the schematic arrangement of the second half portion of the manufacturing system shown in FIG. 1.

The layout of the working region R2 will be described with reference to FIGS. 1 and 12. An unloading table 24 for a laminated body P manufactured by bonding the panels P1 and P2 is arranged downstream of the working region R2. For example, a plurality of pins extend upright on the transfer device 24, and the laminated body P is placed on the plurality of pins.

A support member 3 is arranged in the working region R2. The support member 3 is a base for supporting the respective devices arranged in the working region R2. In this embodiment, the support member 3 is formed as a frame. The relay unit 20, the conveying device CV2, a transfer device 21, a plurality of bonding devices 22, and a decompression device 23 are arranged on the support member 3. In this embodiment, three bonding devices 22 are arranged.

The conveying device CV2 has the same arrangement as the transfer robot RB shown in FIG. 3. Rails RL extend in the X direction. The transfer device 21 has an arrangement obtained by excluding the holding unit 5A from the transfer robot RB shown in FIG. 3. That is, the transfer device 21 is a single arm robot of the holding unit 5B. The rails RL of the conveying device CV2 and the rails RL of the transfer device 21 are spaced apart from each other in the Y direction and are parallel to each other. The three bonding devices 22 are arranged in a line at an equal interval in the X direction in a space between the rails RL of the conveying device CV2 and the rails RL of the transfer device 21. More specifically, the three bonding devices 22 are arranged along the moving path of the conveying device CV2 and the moving units 4 of the transfer device 21. The conveying device CV2 conveys, before any one of the bonding devices 22, the pair of the panels P1 and P2 taken out from the relay unit 20, thereby inputting the pair in the bonding device 22. The transfer device 21 takes out the laminated body P having undergone bonding from the bonding devices 22 and transfers it to the unloading table 24. One of the conveying device CV2 and the transfer device 21 is located on one side in the Y direction of the array of the three bonding devices 22, and the other is located on the other side. The inputting (loading) of the panels P1 and P2 to the bonding device 22 by the conveying device CV2 and the taking out (unloading) of the laminated body P by the transfer device 21 can be efficiently performed without interference.

The relay unit 20 temporarily holds the panels P1 and P2. The relay unit 20 is located between the conveying device CV1 and the conveying device CV2. The pair of the panels P1 and P2 processed by the conveying device CV1 is taken out by the transfer device 19 and transferred to the relay unit 20. That is, the relay unit 20 serves as the connecting region (boundary) between the working regions R1 and R2. The relay unit 20 is located on the outlet side of the working region R1 and on the inlet side of the working region R2.

Figure 13:
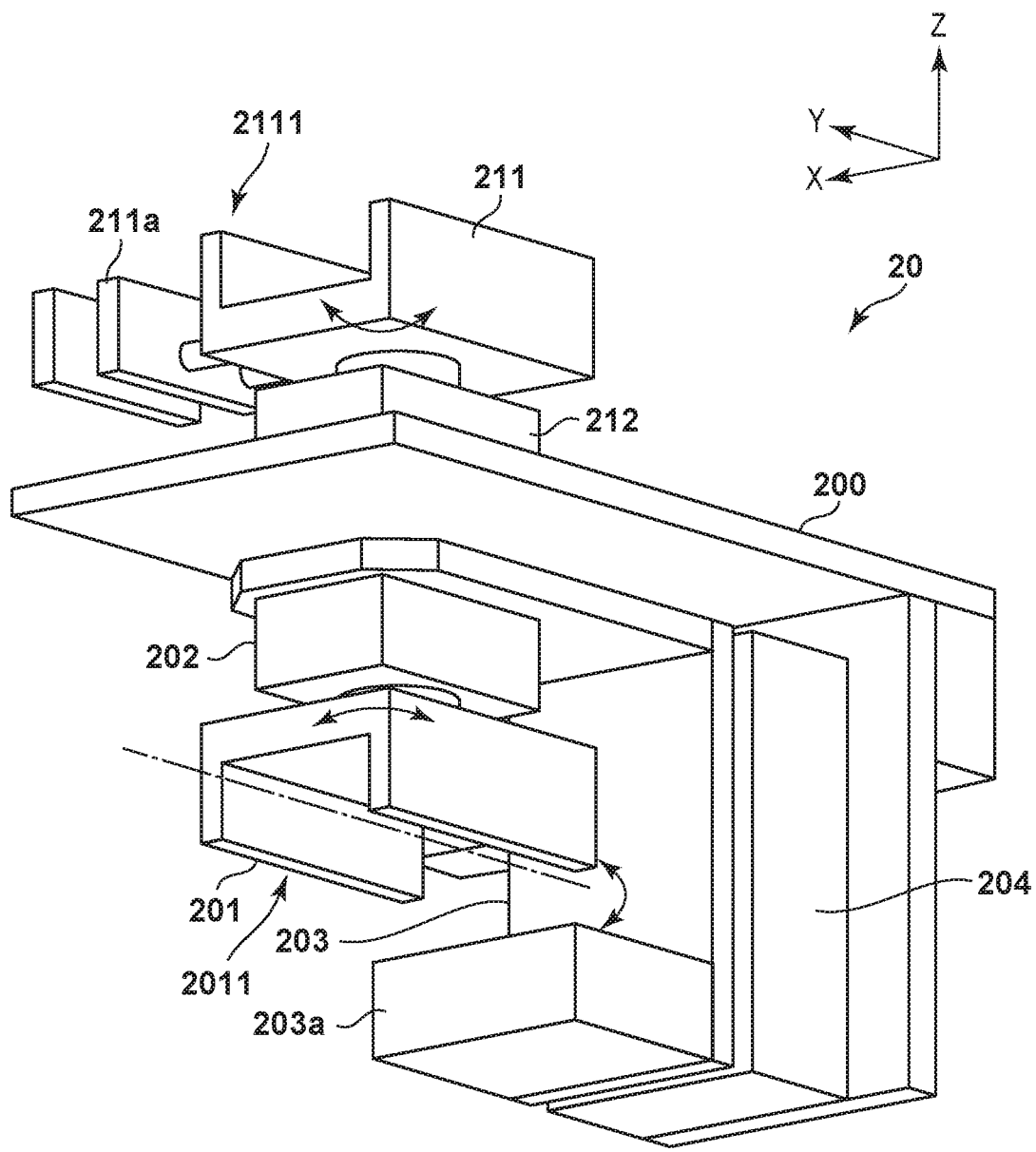
FIG. 13 is a perspective view of a relay unit.

FIG. 13 is a perspective view of the relay unit 20. The relay unit 20 includes holding units 201 and 211, rotating mechanisms 202 and 212, a turnover mechanism 204, and a support member 200 which support the above components.

The holding unit 201 is a unit which holds the panel P1. The holding unit 201 is a gutter-shaped member having a U-shaped section and includes chucking portions for the panel P1 at two open end portions (two lower end portions in FIG. 13) 2011. The chucking portion chucks the panel P1 by, for example, air suction.

The holding unit 211 is a unit which holds the panel P2. The holding unit 211 has the same structure as the holding unit 201 and has an outer shape having a U-shaped section. The holding unit 211 has chucking portions for the panel P2 at two open end portions (two upper end portions in FIG. 13) 2111. The chucking portion chucks the panel P2 by, for example, air suction. In this embodiment, the panel P2 is a liquid crystal display panel and may include accessory parts such as a cable. The holding unit 211 includes a support portion 211a which supports such an accessory part.

The rotating mechanism 202 is a mechanism using, for example, a motor as the driving source, and rotates the holding unit 201 around the Z-axis, thereby freely changing the orientation of the panel P1 in the horizontal direction. Similarly, the rotating mechanism 212 is a mechanism using, for example, a motor as the driving source, and rotates the holding unit 211 around the Z-axis. Accordingly, the orientation of the panel P2 in the horizontal direction can be freely changed.

The turnover mechanism 204 is supported by the support member 200 and is a mechanism using, for example, a motor as the driving source to rotate a support member 203 around the Y-axis. The rotating mechanism 202 is supported by the L-shaped support member 203. Accordingly, the turnover mechanism 204 is turned over to turn over the support member 203, the rotating mechanism 202, and the holding unit 201, thereby turning over the panel P1 held by the holding unit 201. A balance weight 203a is provided on the support member 203 to stabilize the rotation operation and posture of the support member 203.

Upon receiving the panel P1 by the holding unit 201, the turnover mechanism 204 rotates the support member 203 so that the two open end portions 2011 of the holding unit 201 face upward. Upon transferring the panel P1 to the conveying device CV2, the turnover mechanism 204 rotates the support member 203 so that the two end portions 2011 face downward. FIG. 13 shows a state in which the two end portions 2011 of the holding unit 201 face downward. By this operation, the panel P1 is transferred from the transfer device 19 to the holding unit 201 in a posture in which the adhesive coating surface faces upward. The panel P1 is then removed from the holding unit 201 by the conveying device CV2 in a posture in which the coating surface faces downward.

Figure 14:
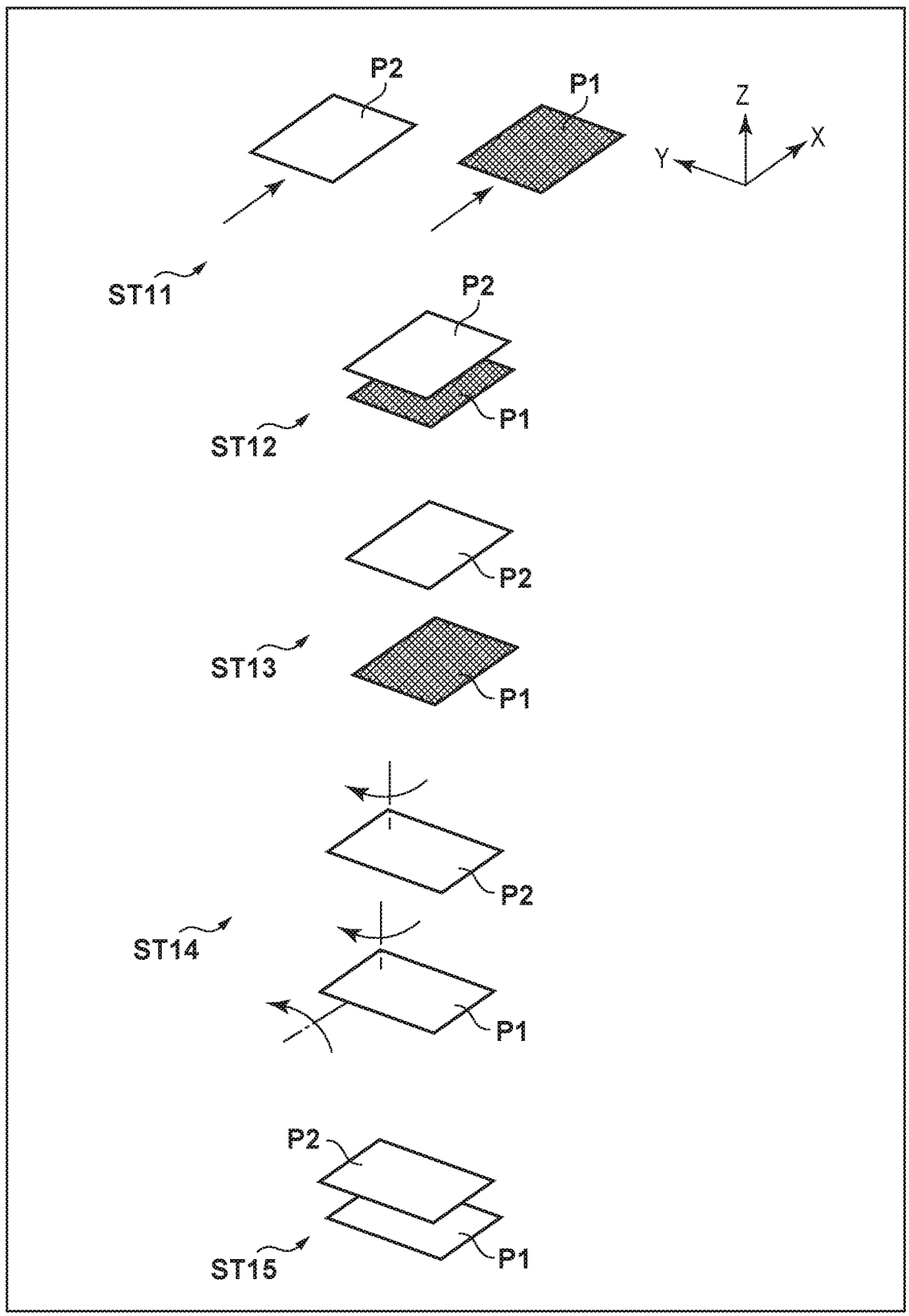
FIG. 14 is a view for explaining the conveying operation of panels.
Figure 15:
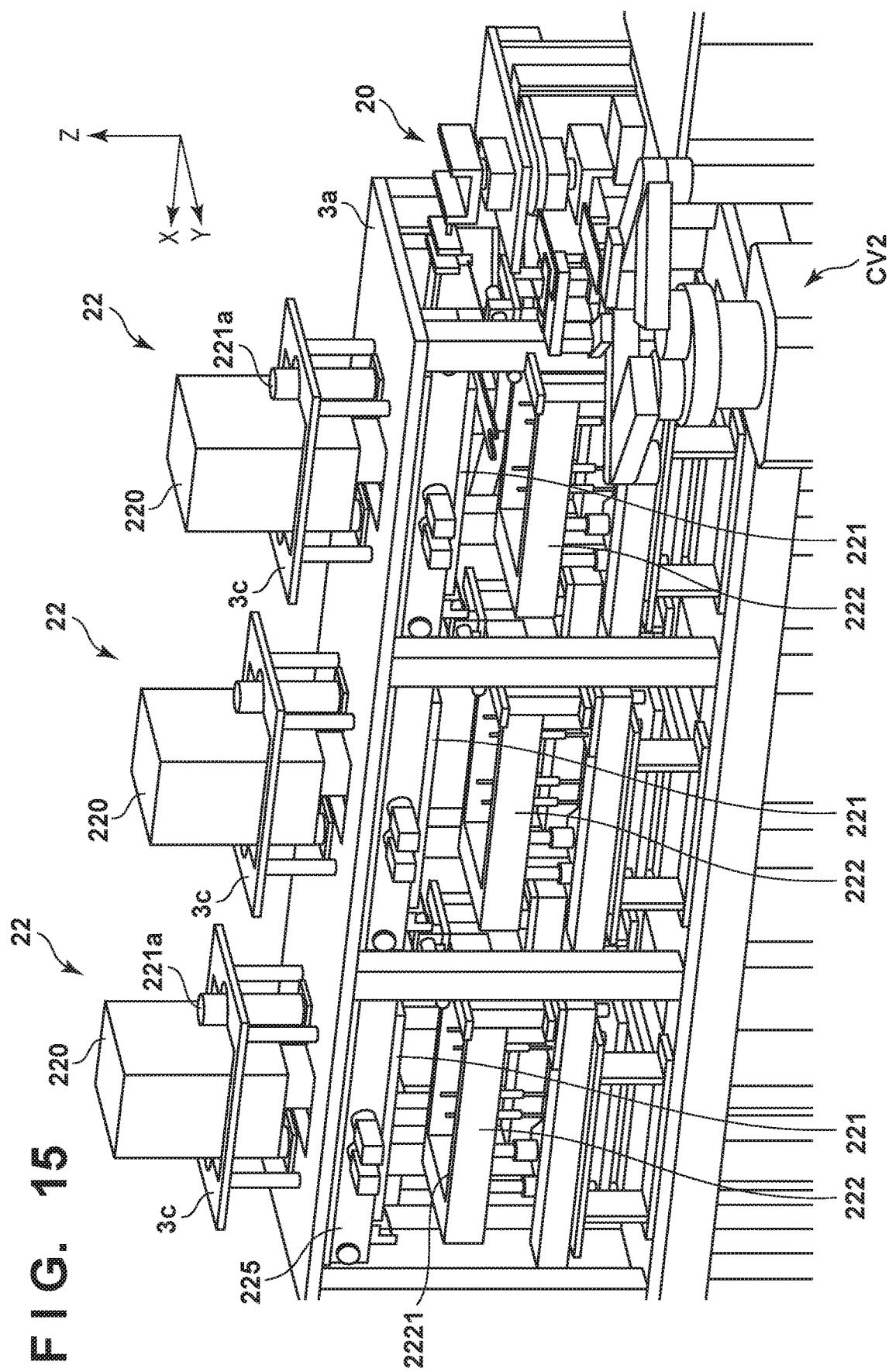
FIG. 15 is a view showing the layout of bonding devices.

FIG. 14 shows changes in posture of the panels P1 and P2 when the panels are transferred from the conveying device CV1 to the relay unit 20 via the transfer device 19 and transferred from the relay unit 20 to the conveying device CV2.

In a state ST11, the panel P1 is located at the downstream end of the conveying mechanism 12, and the panel P2 is located at the downstream end of the conveying mechanism 13 (stop position SP4). The panel P1 and the panel P2 are aligned in the Y direction.

The panel P1 and the panel P2 are transferred by the transfer device 19. A state ST12 indicates a state in which the panel P1 and the panel P2 are held by the transfer device 19. The two panels are aligned in the Z direction. The transfer device 19 transfers the panel P1 and the panel P2 to the relay unit 20.

A state ST13 indicates a state immediately after the panels P1 and P2 are transferred to the relay unit 20. The panel P1 is held on the holding unit 201 such that the adhesive coating surface faces upward. The panel P2 is held on the holding unit 211. As shown in a state ST14, the panel P1 is rotated horizontally through 90 degrees around the Z-axis and turned over around the X-axis by driving the rotating mechanisms 202 and 212 and driving the turnover mechanism 204. The panel P2 is rotated only horizontally through 90 degrees around the Z-axis. The adhesive coating surface of the panel P1 faces downward.

The conveying device CV2 then takes out the panels P1 and P2 from the relay unit 20. A state ST15 indicates a state in which the panel P1 and the panel P2 are held by the conveying device CV2, and the two panels are aligned in the Z direction. Since the lower surface of the panel P1 serves as the adhesive coating surface, the hand portion 52 which holds the panel P1 holds, on its lower surface, the upper surface (the surface not coating with the adhesive). Out of the three bonding devices 22, the pair of the panel P1 and the panel P2 is conveyed to an empty bonding device 22 (that is, the bonding device 22 in a reception ready state).

The arrangements of the bonding devices 22 will be described with reference to FIGS. 15 to 18. Each bonding device 22 includes an upper chamber forming member 221 and a lower chamber forming member 222, both of which form a chamber unit. The upper chamber forming member 221 has a box shape whose bottom portion is open. The lower chamber forming member 222 has a box shape whose top portion is open. The shape and size of an opening edge 2211 (see FIG. 17) of the upper chamber forming member 221 are the same as those of an opening edge 2221 (see FIG. 16) of the lower chamber forming member 222. When the chamber forming members 221 and 222 are brought into tight contact vertically while facing each other, an internal space forms an airtight space (to be referred to as a pasting working space hereinafter) for pasting the panels P1 and P2. In a state in which the upper chamber forming member 221 and the lower chamber forming member 222 are vertically separated, a gap between the opening edges 2211 and 2221 on the side of the conveying device CV2 forms an inputting portion for inputting the panels P1 and P2. A gap between the opening edges 2211 and 2221 on the side of the transfer device 21 forms an ejection portion for ejecting the panels P1 and P2 bonded to each other (that is, the laminated body P).

Figure 16:
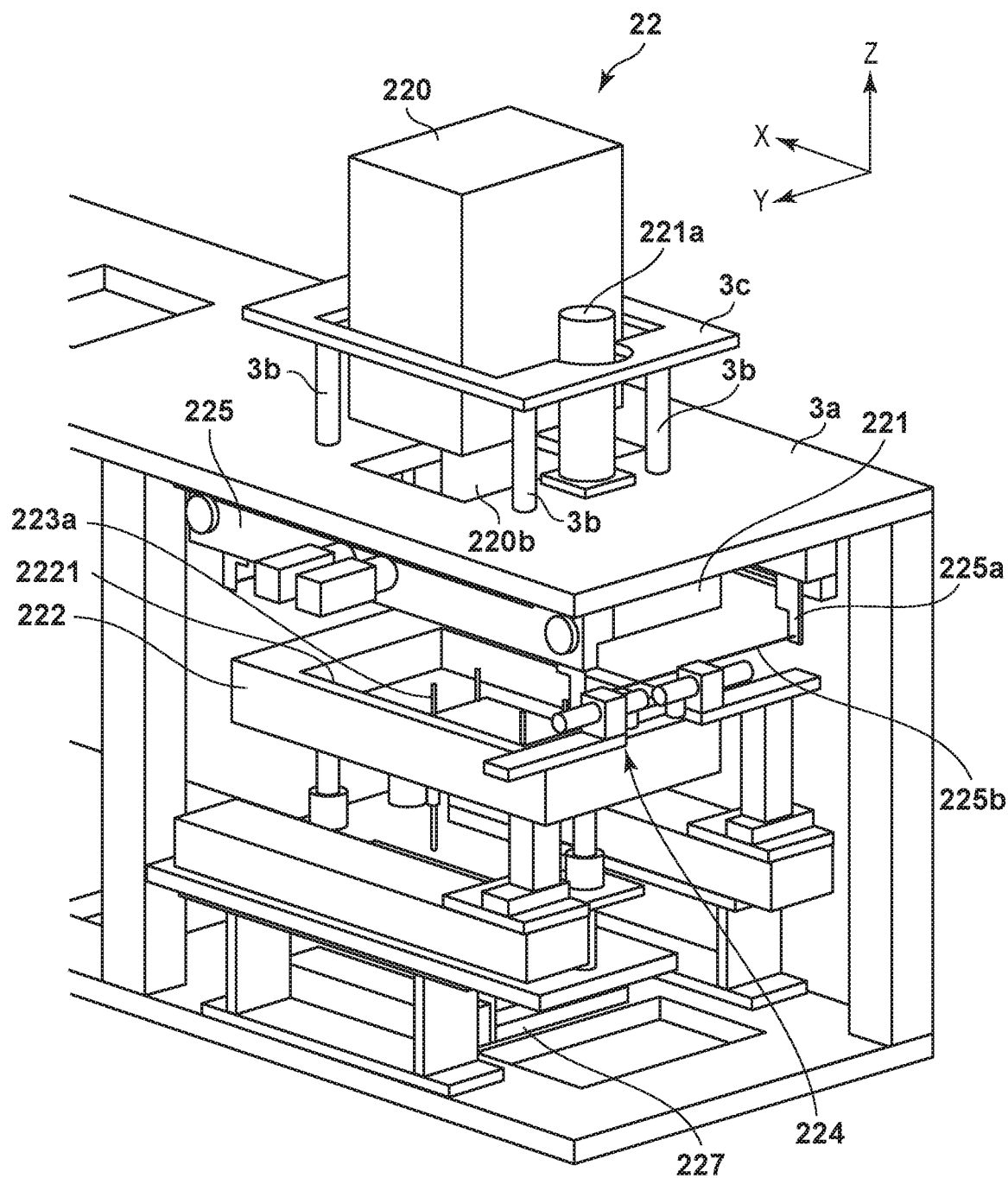
FIG. 16 is a perspective view of the bonding device.
Figure 17:
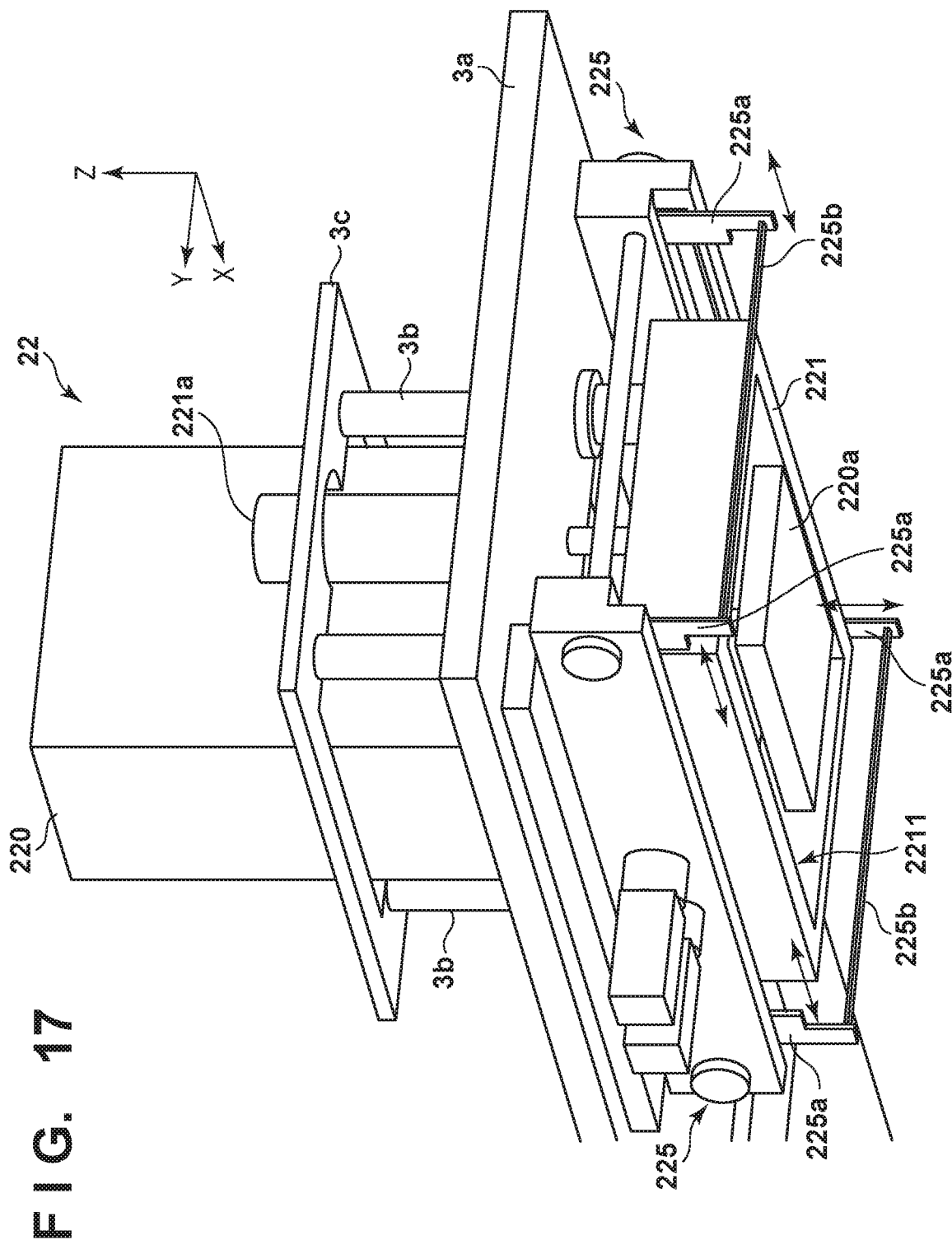
FIG. 17 is a perspective view of the upper portion of the bonding device shown in FIG. 16.

A bonding support portion 220a for supporting the panel P1 is arranged inside the upper chamber forming member 221, mainly shown in FIG. 17. A chucking portion is formed on the lower end surface of the bonding support portion 220a. This chucking portion chucks and holds the surface of the panel P1 to which the adhesive is not applied. Each press moving mechanism 220 is supported by a frame member 3c serving as part of the support member 3. The frame member 3c is supported by a plurality of columns 3b extending upright on the table portion 3a. The press moving mechanism 220 includes a lifting shaft 220b (see FIG. 16), a driving mechanism for moving the lifting shaft 220b in the Z direction, and a driving mechanism for rotating the lifting shaft 220b around the Z-axis. The lifting shaft 220b extends downward through the opening of the table 3a and is provided to airtightly extend through the top portion of the upper chamber forming member 221. The bonding support portion 220a is fixed to the lower end portion of the lifting shaft 220b to lift or turn the bonding support portion 220a by the lifting or turning operation of the lifting shaft 220b.

A lifting mechanism 221a such as an electric cylinder is supported on the table portion 3a. The lifting mechanism 221a vertically moves the upper chamber forming member 221. The table portion 3a also supports a pair of temporary mounting units 225. The temporary mounting units 225 are units for temporarily supporting the panel P1. Each temporary mounting unit 225 includes two sliders 225a spaced apart from each other in the X direction and a driving mechanism for moving the sliders 225a in the X direction. A bar 225b is bridged between the sliders 225a of the pair of temporary mounting units 225. The panel P1 to be transferred from the conveying device CV2 is temporarily supported on both the bars 225b and then transferred to the bonding support portion 220a.

Figure 18:
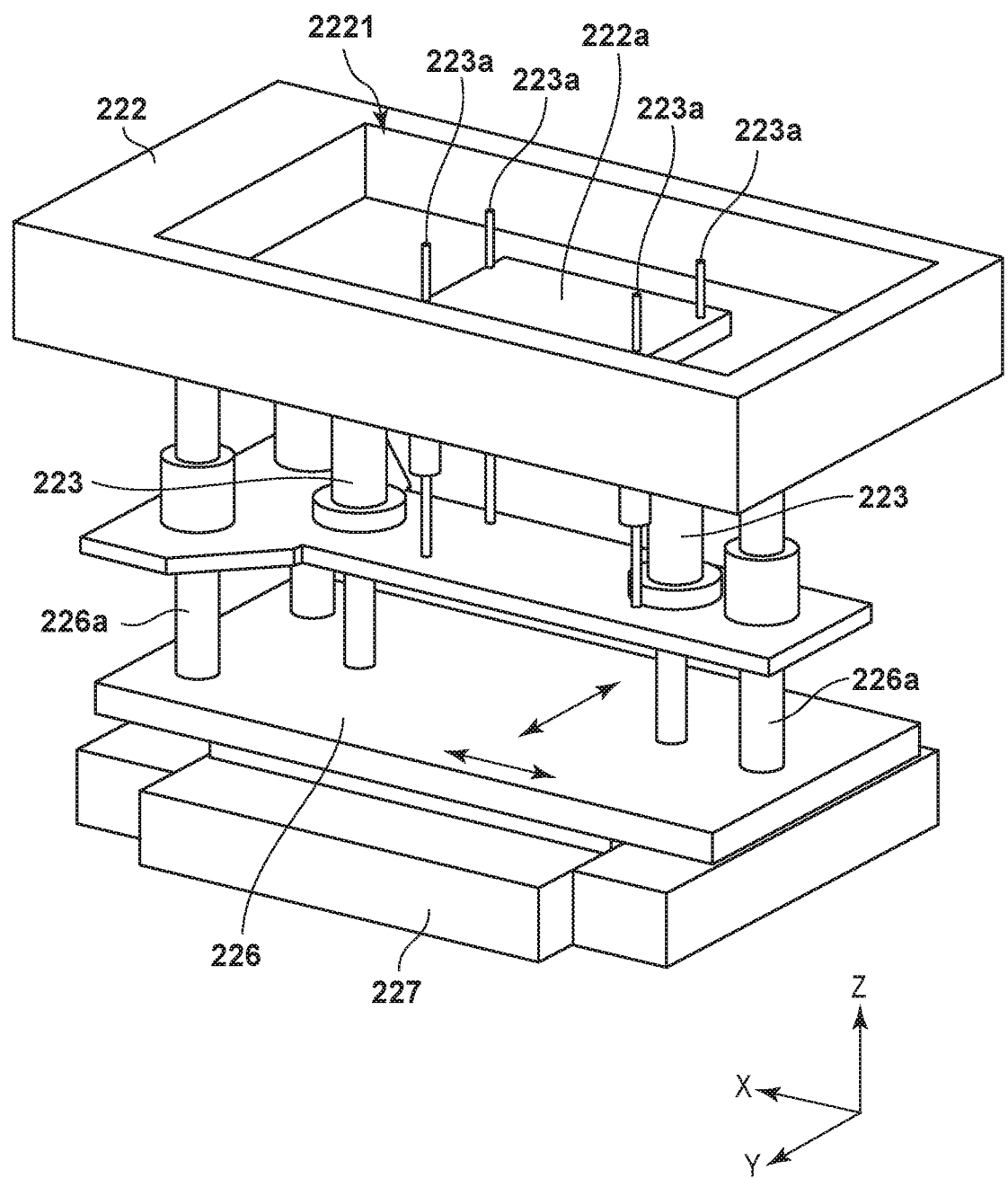
FIG. 18 is a perspective view of the lower portion of the bonding device shown in FIG. 16.

A bonding support portion 222a which supports the panel P2 is arranged in the bottom portion of the internal space of the lower chamber forming member 222, as shown in FIG. 18. A chucking portion is arranged on the upper surface of the bonding support portion 222a. The chucking portion chucks and holds the non-bonding surface of the panel P2.

A plurality of mounting members 233a are arranged in the internal bottom portion of the lower chamber forming member 222. The plurality of mounting members 233a are members which temporarily support the panel P2. The mounting members 233a have a pin-like shape and extend through the bottom portion of the lower chamber forming member 222. The lower end portions of the mounting members 233a are supported on lifting mechanisms 223. The lifting mechanisms 223 move the plurality of mounting members 233a in the Z direction. The panel P2 transferred from the conveying device CV2 is temporarily supported on the plurality of mounting members 233a. The plurality of mounting members 233a are then moved by the lifting mechanisms 223 downward, and the panel P2 on the mounting members 233a is transferred to the bonding support portion 222a.

The lower chamber forming member 222 is supported on a base plate 226 via columns 226a. The base plate 226 is provided on a multiaxial slider 227 and moved in the X and Y directions. The positions of the panel P2 in the lower chamber forming member 222 can be adjusted in the X and Y directions. For example, an X-Y table is enumerated as the multiaxial slider 227.

As shown in FIG. 16, each bonding device 22 includes a measuring device 224. The measuring device 224 is made from a pair of shooting units facing each other in the Y direction. The measuring device 224 is arranged such that shooting portions (not shown) capable of performing shooting in the vertical direction face each other vertically. The rest of the measuring device 224 is the same as the arrangement of the measuring device 14 described above. In this embodiment, one measuring device 224 measures the position or the like of the panel P1, and the other measuring device 224 measures the position or the like of the panel P2 when the panel P2 is supported on the bonding support portion 222a. In the measuring device 224, the pair of shooting units are moved together in the X and Y directions to shoot the panel P2 from above and the panel P1 from below, thereby measuring the positions and postures of the respective panels. In accordance with the measurement results of the panel P1 and the panel P2, the multiaxial slider 227 adjusts the position of the panel P2 in the X and Y directions, and the lifting shaft 220b adjusts the position of the panel P1 around the Z-axis. These position adjustment operations allow the alignment of the panel P1 and the panel P2, thereby locating the panels P1 and P2 at the bonding position.

Figure 19:
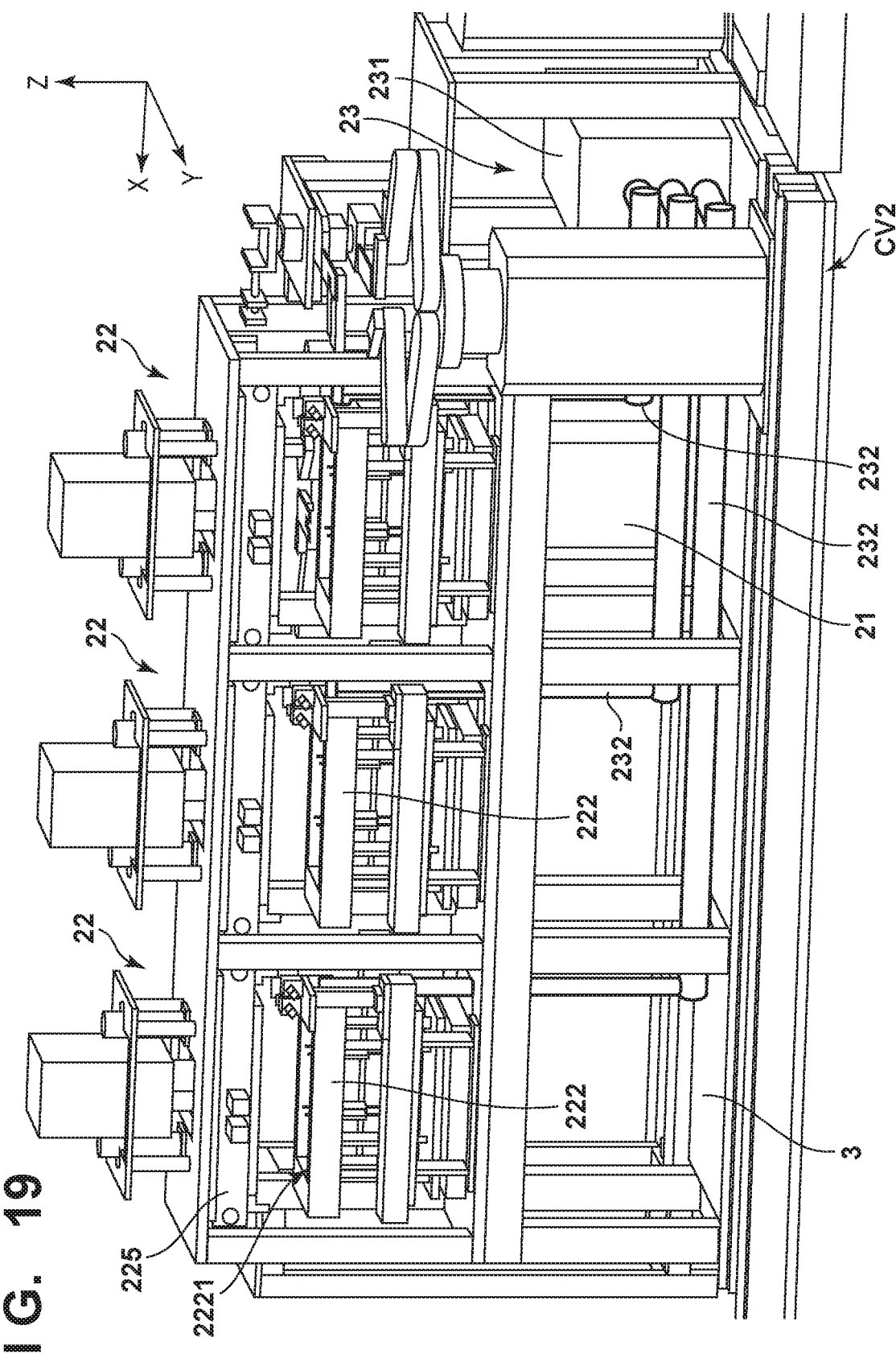
FIG. 19 is a view for explaining a decompressing device.
Figure 20:
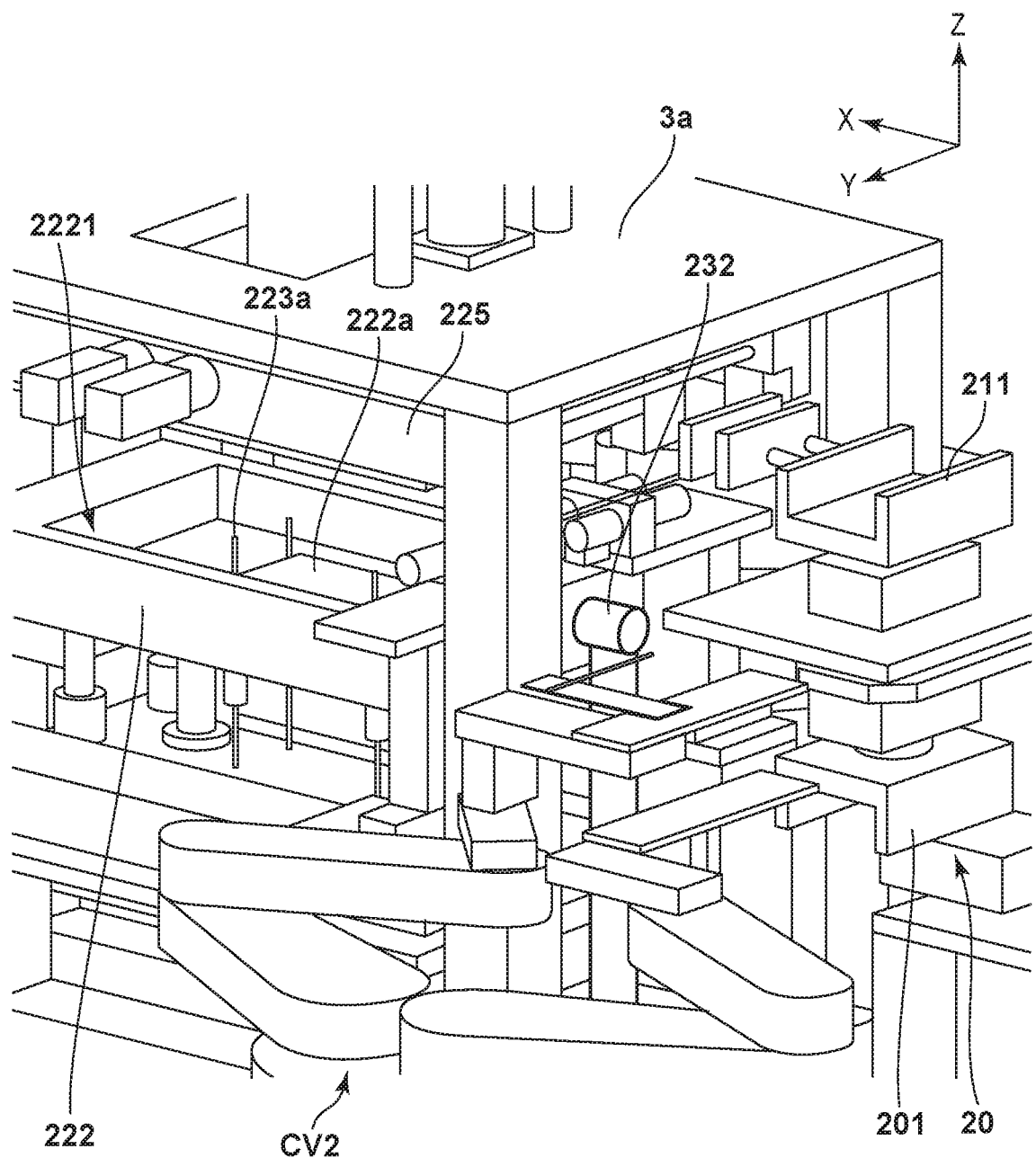
FIG. 20 is a view for explaining the decompressing device.

When bonding the panel P1 and the panel P2, by evacuating the pasting working space is evacuated close to a vacuum state, mixing of bubbles to the bonding surface can be suppressed, and the bubbles can be removed. The decompression device 23 is a device for evacuating the pasting working space. Referring to FIGS. 19 and 20, the decompression device 23 includes a decompression generator 231 and decompression passages 232. The decompression generator 231 includes a mechanism such as a vacuum pump included in each bonding device 22 to generate a negative pressure. The decompression passages 232 are pipes which connect the decompression generator 231 and the lower chamber forming member 222. The decompression generator 231 and the decompression passages 232 are supported on the support member 3. In particular, the decompression passages 232 are supported at a plurality of portions. When the common support member 3 supports each bonding device 22 and the decompression device 23 at predetermined support positions, the positional relationship between each bonding device 22 and the decompression device 231 is decided, and the decompression passages 232 which connect them are decided. The lengths of the decompression passages 232 can be defined and set.

The panel P1 and the panel P2 are bonded by the plurality of bonding devices 22 such that the panel P1 and the panel P2 serving as the bonding targets are transferred to the bonding devices 22 by one conveying device CV2. The laminated body P obtained by bonding is transferred from the bonding devices 22 to the transfer device 24 by one transfer device 21. Conveyance to the plurality of conveyance destination by one conveying device CV2 or conveyance from the plurality of conveyance sources by one transfer device 21 is managed by the processing times of the bonding devices 22. By setting the lengths of the decompression passages 232, the processing time management can be facilitated, so that the conveyance management in the working region R2 can be optimally managed. In addition, the bonding devices 22 and the decompression generator 231 are arranged at the predetermined positions of the common support member 3, and the decompression passages 232 are arranged on the common support member 3. The entire apparatus can be moved while maintaining the relationship between the bonding devices 22, the decompression generator 231, and the decompression passages 232. The apparatus is free from influences accompanying layout changes in a factory. The decompression conditions of the bonding devices 22 are maintained even after the layout changes, and conveyance management can be facilitated. In addition, if maintenance such as the replacement of the decompression generator 231, the replacement of the pipe of the decompression passages 232, and the replacement of the lower chamber forming member 222 is required, the positioning operation and the coating condition setting operation after the replacement can be facilitated because the layout positions are already determined, thereby improving the maintenance.

Figure 21:
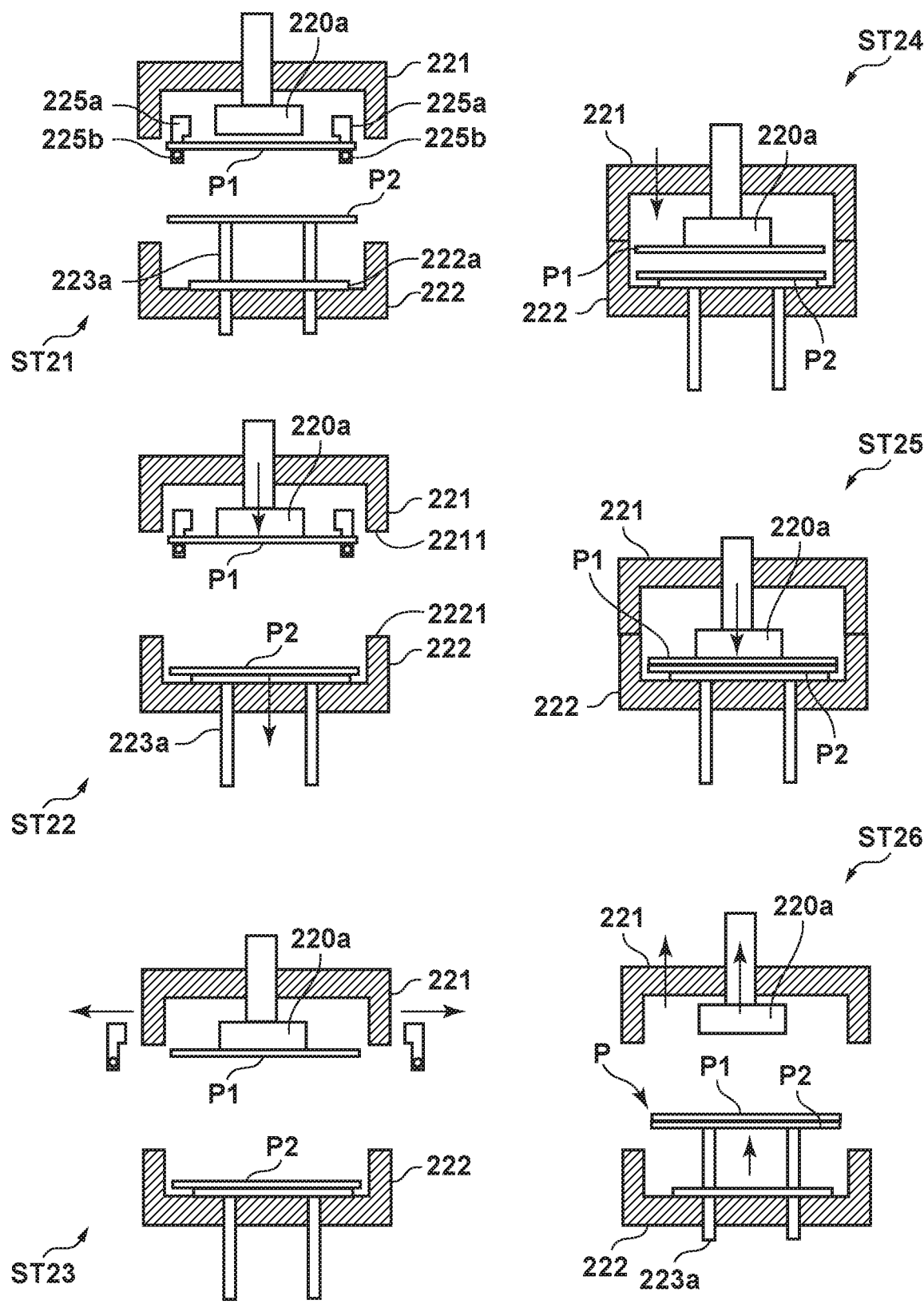
FIG. 21 is a view for explaining the operation of the bonding device shown in FIG. 16.

The bonding operation of the panels P1 and P2 by each bonding device 22 will be described with reference to FIG. 21.

A state ST21 indicates a stage in which the pair of the panels P1 and P2 are input from the conveying device CV2. The chamber forming members 221 and 222 are spaced apart from each other vertically. The bonding support portion 220a is located in the upper portion inside the upper chamber forming member 221, and the panel P1 is placed on the bars 225b. The plurality of mounting members 223a are located at the upper position, and the panel P2 is placed on the plurality of mounting members 223a.

Next, as shown in a state ST22, the bonding support portion 220a is moved downward, the panel P1 placed on the bars 225b is chucked by the bonding support portion 220a. In addition, the plurality of mounting members 223a are moved downward, and the panel P2 is placed on and held by the bonding support portion 222a.

Next, as shown in a state ST23, the bars 225b are moved in directions (X direction) to be spaced apart from each other and are retracted laterally from the positions below the upper chamber forming member 221. In the stage of the state ST23, the bonding position of the panels P1 and P2 is adjusted by measurement of the panel P2 by the measuring device 224, horizontal movement of the panel P2 by the multiaxial slider 227, and rotation of the panel P1 by the lifting shaft 220b.

Next, as shown in a state ST24, the lifting mechanism 221a moves the upper chamber forming member 221 downward, and the opening edge 2211 of the upper chamber forming member 221 abuts against the opening edge 2221 of the lower chamber forming member 222. The pasting working space is formed in the sealed lower chamber forming member 222. After that, the pasting working space is evacuated by the operation of the decompression device 23.

Next, as shown in a state ST25, the press moving mechanism 220 moves the bonding support portion 220a downward to press the panel P1 against the panel P2. Accordingly, these panels are bonded to each other to manufacture the laminated body P. In this embodiment, the bonding support portion 220a is moved in a direction for making the panel P1 and the panel P2 to come close or separate from each other (Z direction). An arrangement for moving the bonding support portion 222a can also be employed.

After that, the decompression device 23 is stopped, holding of the panels P1 and P2 is canceled, and the pasting working space is returned to the atmospheric pressure. As shown in a state ST26, the lifting mechanism 221a moves the upper chamber forming member 221 upward to often the pasting working space. The plurality of mounting members 223a are moved upward to lift the laminated body P from the bonding support portion 222a. The transfer device 21 scrapes the laminated body P and transfers it to the unloading table 24.

<Control System>

Figure 22:
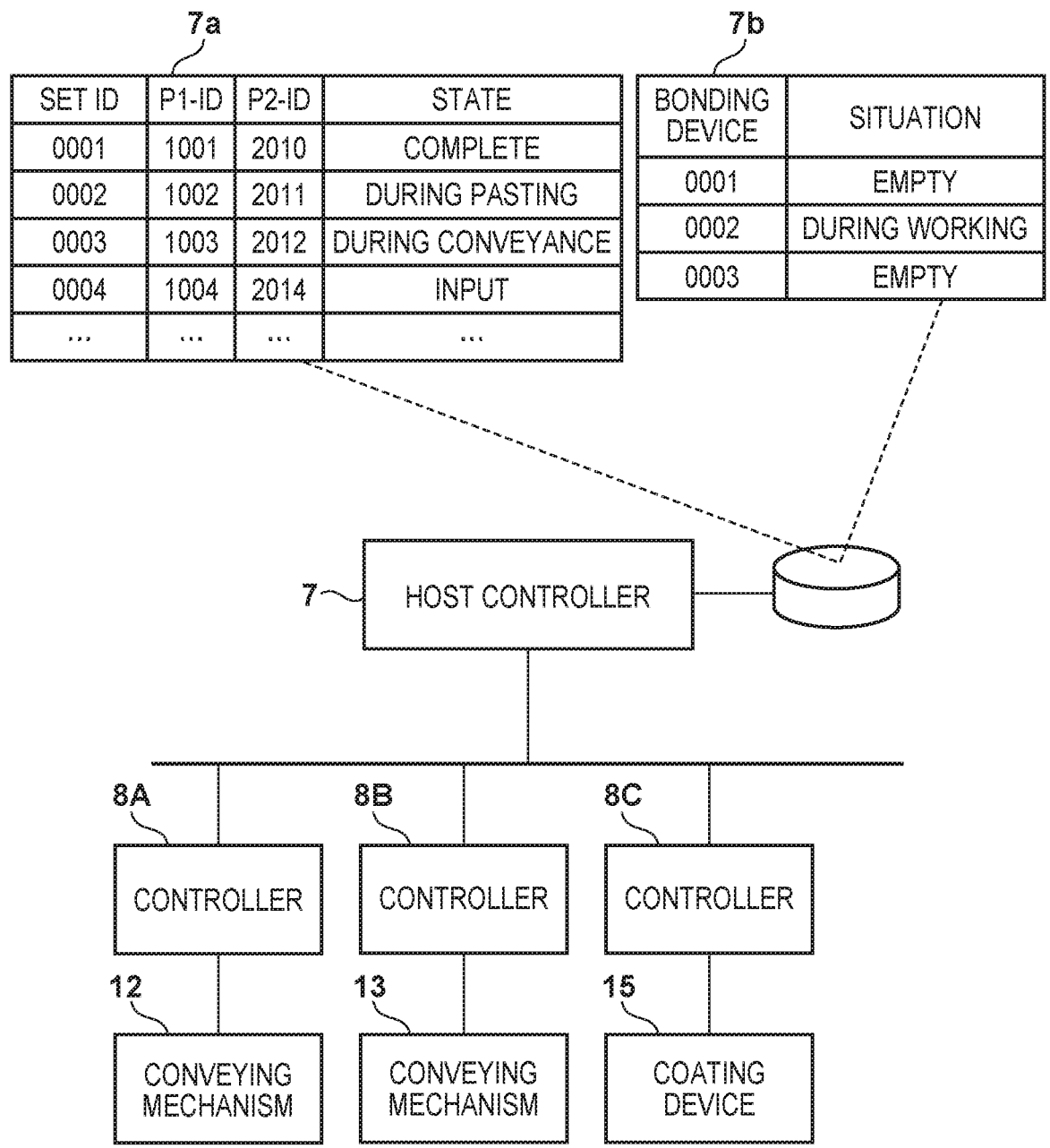
FIG. 22 is a block diagram of the control system of the manufacturing system shown in FIG. 1.

FIG. 22 is a block diagram of the control system of the manufacturing system 1. Controllers are arranged for the respective devices or mechanisms of the manufacturing system 1 and control them. In the example of FIG. 22, controllers 8A to 8C for the conveying mechanism 12, the conveying mechanism 13, and the coating device 15 are exemplified. This also applies to other mechanisms or devices. Each controller is communicably connected to a host controller 7 via a communication line such as a LAN. Each controller or the host controller 7 includes, for example, a processing unit such as a CPU, a storage unit for storing programs and data to be executed by the processor, input/output interfaces with a sensor and an actuator, and a communication interface.

The host controller 7 controls the entire manufacturing system 1. The storage unit of the host controller 7 stores working information 7a and situation information 7b. The working information 7a includes information for specifying the pair of the panels P1 and P2 to be bonded to each other, and information of a working state. The information for specifying the pair includes information such as an ID for each pair and an ID for each panel. These pieces of information facilitate management and specifying of a combination of the panels P1 and P2 during or after the manufacture. The situation information 7b indicates a bonding situation of each bonding device 22. By this information, the bonding device 22 ready to receive the pair of panels can be selected.

Figure 23:
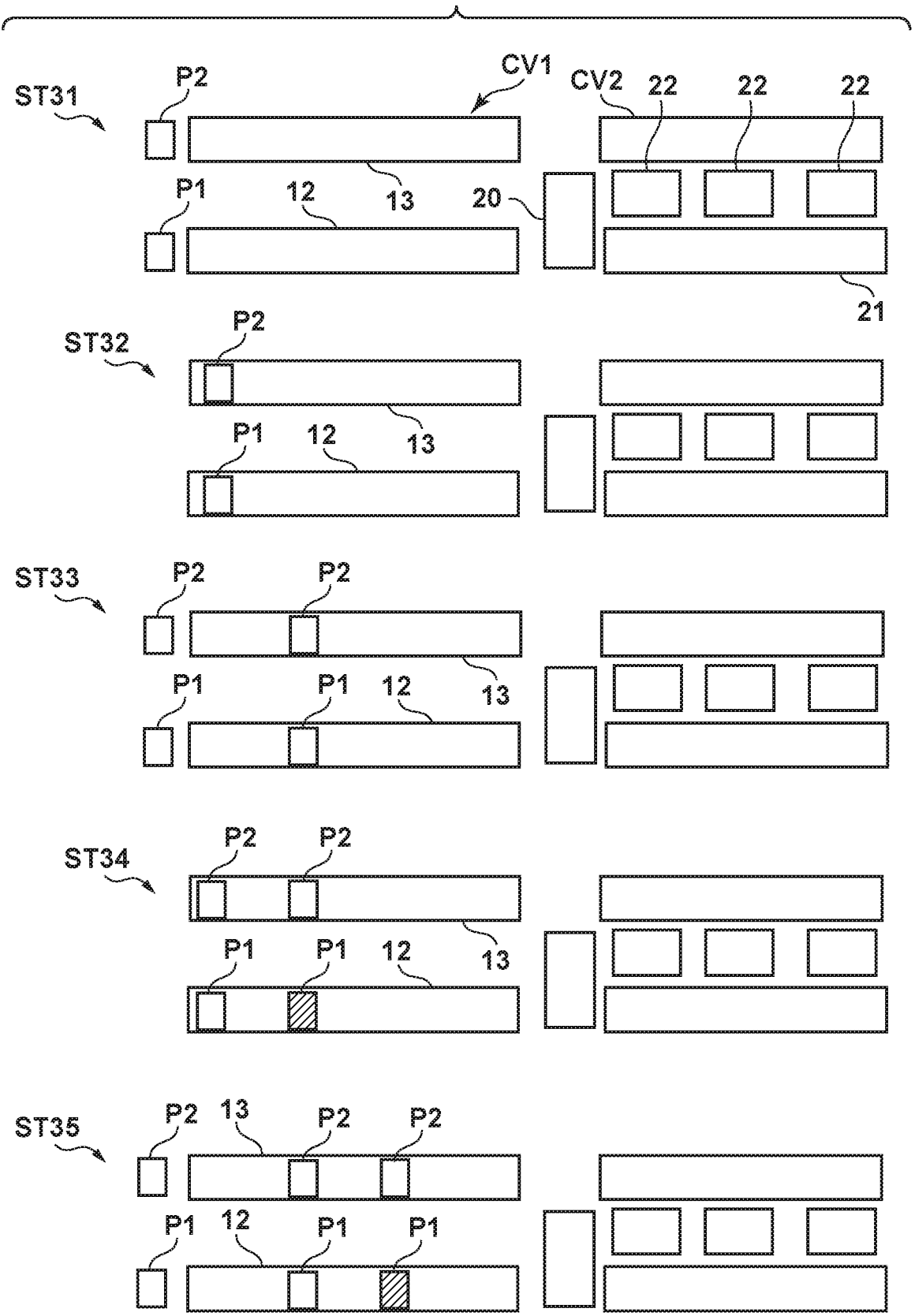
FIG. 23 is a view for explaining a conveyance example of the panels.
Figure 24:
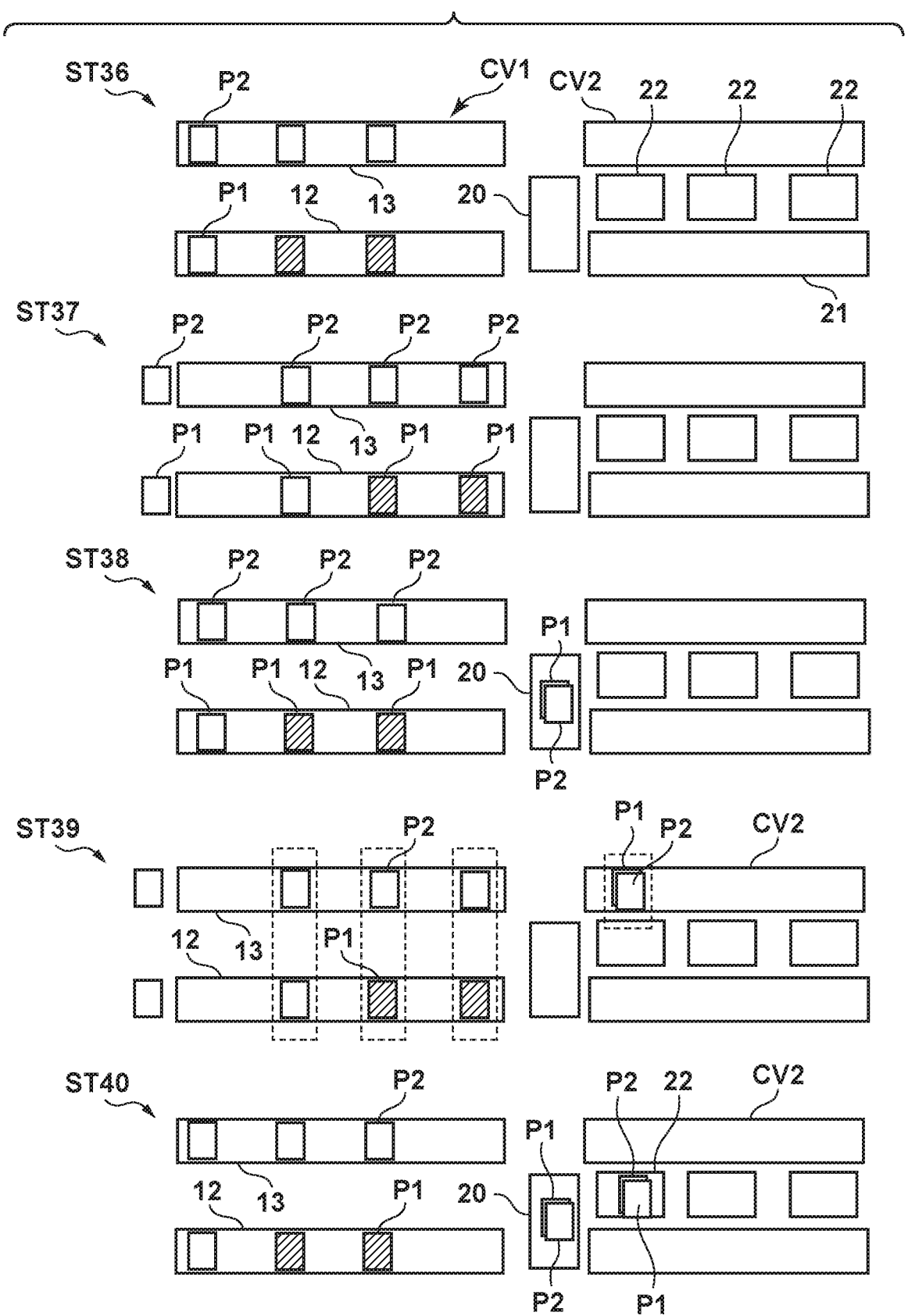
FIG. 24 is a view for explaining a conveyance example of the panels.
Figure 25:
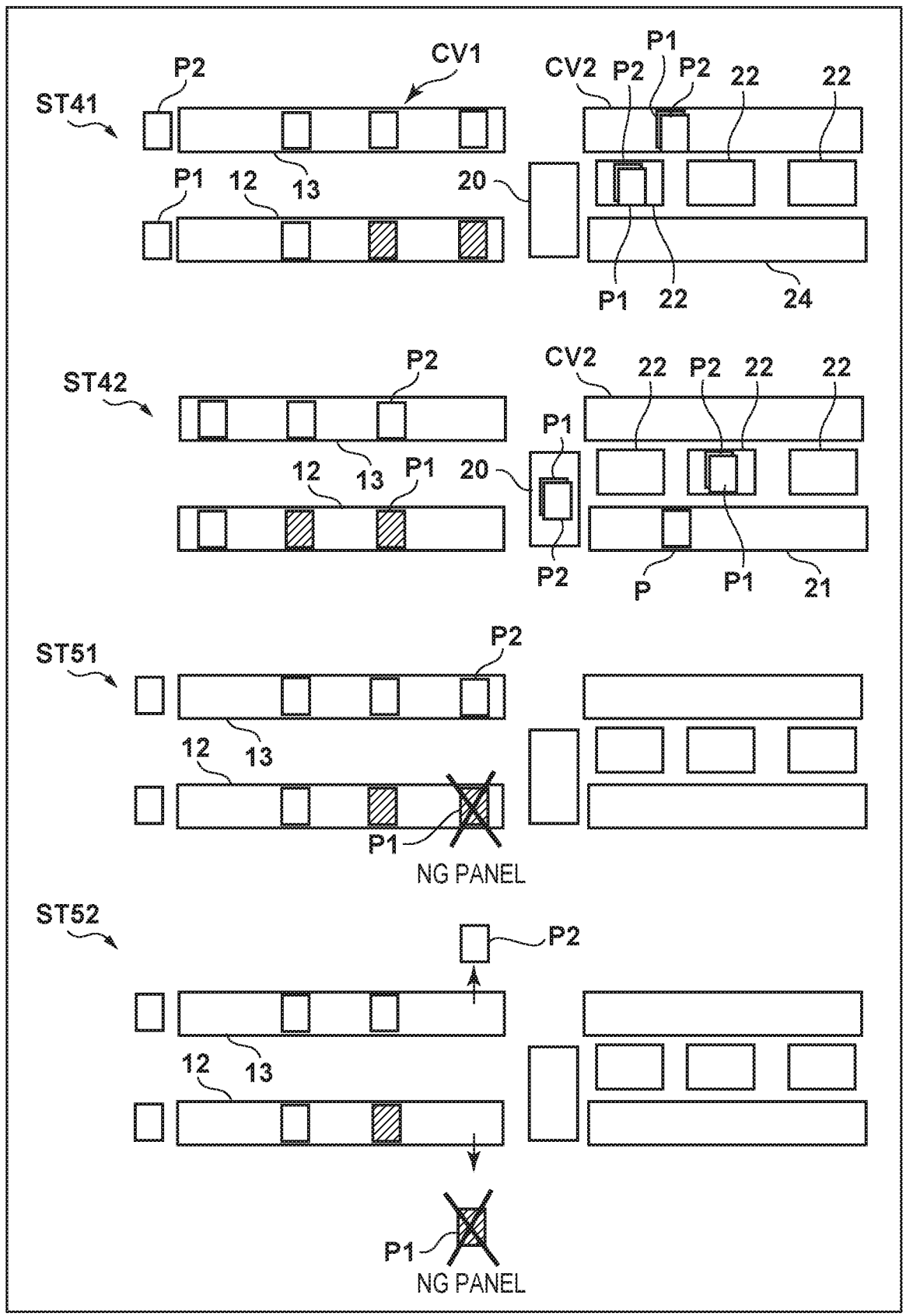
FIG. 25 is a view for explaining a conveyance example of the panels.

FIGS. 23 to 25 schematically illustrate a control example of the manufacturing system 1. In this case, the conveyance mode of the panels P1 and P2 will be mainly described.

A state ST31 indicates a stage in which the pair of panels P1 and P2 are input from the previous step to the input tables 10A and 10B. After that, as shown in a state ST32, the transfer device 11 transfers the panels P1 and P2 to the conveying device CV1. The panel P1 is transferred to the conveying mechanism 12 (the position at the measuring device 14), and the panel P2 is transferred to the mechanism 13 (stop position SP1).

A state ST33 indicates a stage in which conveyance of the panels P1 and P2 first input is started. The panel P1 is conveyed to the stop position SP2. The controller 8B of the conveying mechanism 13 drives the conveying mechanism 13 in accordance with the conveyance control operation of the conveying mechanism 12 by the controller 8A. For this reason, the panel P2 is conveyed to the stop position SP2. In the state ST33, the next pair of panels P1 and P2 are input from the previous step to the input tables 10A and 10B.

In a state ST34, the coating device 15 coats the first input panel P1 with the adhesive. The second input panels P1 and P2 are transferred to the conveying device CV1 by the transfer device 11.

In a state ST35, the first input panel P1 has been conveyed to the stop position SP3. Along with this, the first input panel P2 is also conveyed to the stop position SP3. The second input panels P1 and P2 are conveyed to the stop position SP2. In a state ST36, the first input panel P1 is irradiated with ultraviolet rays, and the third input panels P1 and P2 are transferred to the stop position SP1.

In a state ST37, the first input panel P1 has been conveyed to the stop position SP4. Along with this, the first input panel P2 is also conveyed to the stop position SP4. At the stop position SP4, the measuring device 18 measures the film thickness of the panel P1. The second input panels P1 and P2 are conveyed to the stop position SP3, and the third input panels P1 and P2 are conveyed to the stop position SP2. The fourth panels P1 and P2 are input.

In a state ST38, the transfer device 19 transfers the first input panels P1 and P2 to the relay unit 20. The changes in orientation of the panels P1 and P2 and the turnover of the panel P1 are performed. The fourth panels P1 and P2 are transferred to the stop position SP1.

In a state ST39, the conveying device CV2 has conveyed the first input panels P1 and P2 from the relay unit 20. In the working region R1, horizontal parallel conveyance for conveying the panels P1 and P2 in parallel left and right of the conveyance direction is performed. However, in the working region R2, vertical parallel conveyance for conveying the panels P1 and P2 in parallel above and below the conveyance direction is performed. By switching the parallel direction, the conveyance modes suitable, respectively, for the adhesive coating and the panel bonding can be taken.

In the state ST39, as surrounded by the broken lines, in all cases, the panels P1 and P2 are paired and conveyed. In the horizontal parallel conveyance, although a small conveyance shift occurs between the stop positions is present, the combined panels P1 and P2 are aligned in the left and right directions (Y direction) and stopped at each stop position. In the vertical parallel conveyance, the combined panels P1 and P2 are conveyed without any positional shift. These conveyance modes facilitate management and worker's visual recognition of the combination of the panels to be bonded to each other from the viewpoint of control.

In a state ST40, the conveying device CV2 inputs the first input panels P1 and P2 to any one of the bonding devices 22, thereby performing the pasting operation. The bonding device 22 to be used is selected with reference to the situation information 7b. The transfer device 19 transfers the second input panels P1 and P2 to the relay unit 20.

In a state ST41, the conveying device CV2 inputs the second input panels P1 and P2 to another bonding device 22, thereby performing the pasting operation. The bonding device 22 to be used is selected with reference to the situation information 7b. The third and fourth input panels P1 and P2 are sequentially conveyed to the next stop positions, and fifth panels P1 and P2 are input.

In a state ST42, bonding of the first input panels P1 and P2 is complete, and the transfer device 21 unloads the corresponding laminated body P from the corresponding bonding device 22. The transfer device 21 transfers the laminated body P to the unloading table 24. The laminated body P on the unloading table 24 is conveyed to the next step by a device (not shown). By repeating the above procedure, the laminated body P is manufactured.

A countermeasure upon occurrence of an abnormality in the panel P1 or P2 will be described below. A state ST51 assumes that the result of the film thickness measurement of the adhesive of the panel P1 by the measuring device 18 is not acceptable (NG). In this case, the operator or a device (not shown) removes, from a line, the panel P1 determined to be not acceptable, as shown in a state ST52. At this time, the panel P2 to be paired with this panel P1 is also removed from the line. The manufacture of the laminated body P can continue without changing the combination of the panels P1 and P2.

<Layout Example of System>

In this embodiment, since the working region R1 for mainly performing adhesive coating and the working region R2 for mainly performing bonding of the panels are separated to constitute the system, a layout change is flexible. For example, if the load of the working region R2 is high (the required time for the processing in the working region R2 is long), a layout LO1 in FIG. 26 can be employed.

The layout LO1 is an arrangement in which a plurality of working regions R2 are parallel to each other for one working region R1. The layout LO1 can cope with the high load by simply increasing the moving path of the transfer device 19 to a range across the plurality of working regions R2.

Figure 26:
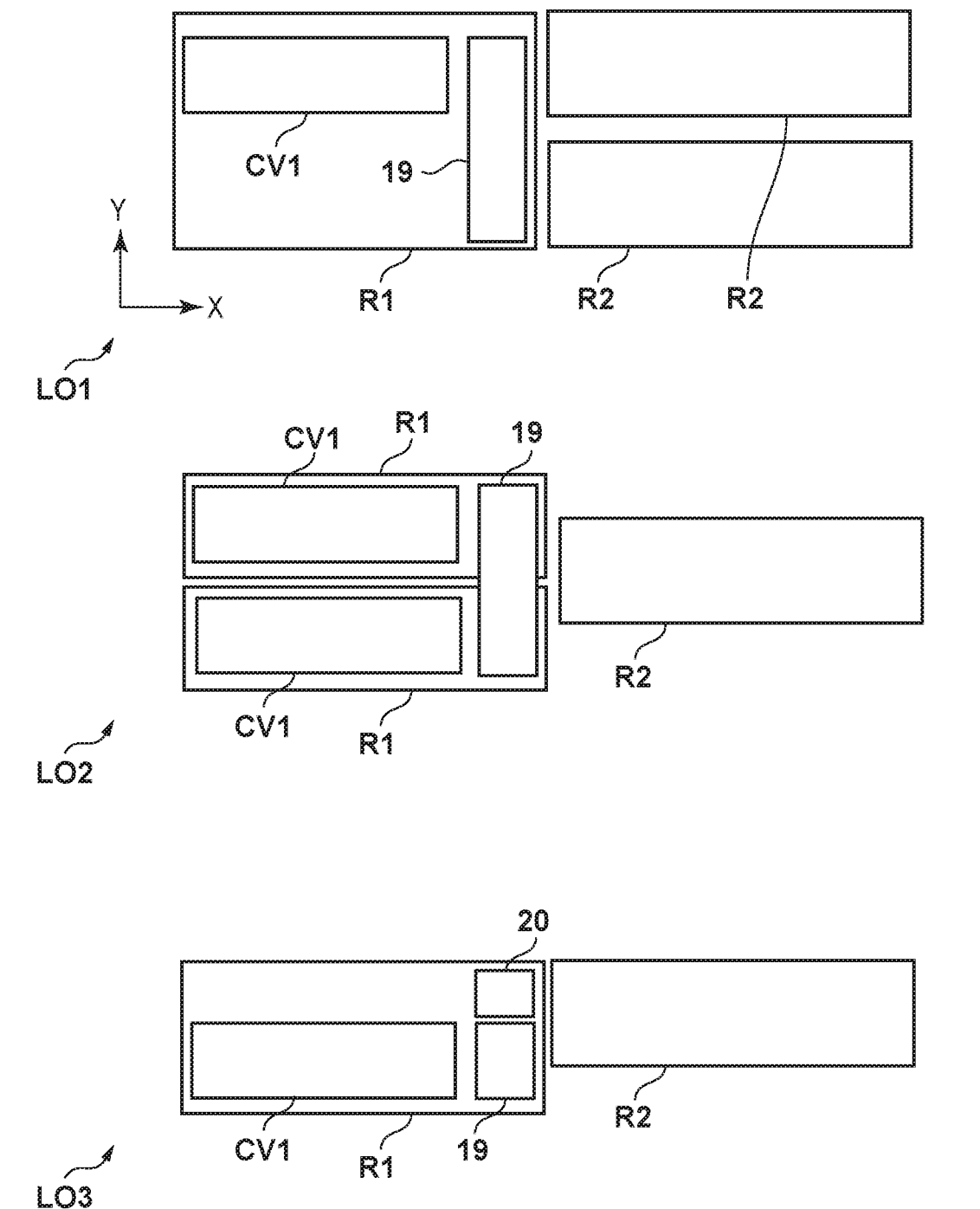
FIG. 26 is a view showing other layout examples of the system.

If the load of the working region R1 is high (if the required time of the processing in the working region R1 is long), a layout LO2 in FIG. 26 can be employed. A plurality of working regions R1 are set parallel to each other. The transfer device 19 is shared by the plurality of working regions R1, and its moving path extends to a range across the plurality of working regions R1.

A layout LO3 in FIG. 26 can also be employed as another layout. The layout LO3 is a layout in which the relay unit 20 is arranged in the working region R1.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent arrangements and functions.

This application claims the benefits of Japanese Patent Application No. 2017-061785, filed Mar. 27, 2017, which is hereby incorporated by reference herein in its entirety.

What is claimed is:

1. A manufacturing system for manufacturing a laminated body by coating a first panel with an adhesive in a first working region and bonding the first panel coated with the adhesive and a second panel in a second working region, comprising:
   a first conveying device arranged in the first working region and configured to convey the first panel and the second panel in parallel, the first conveying device including a first conveying mechanism for the first panel and a second conveying mechanism for the second panel which are arranged in parallel;
   a coating device arranged in the first working region and configured to coat, with the adhesive, the first panel conveyed by the first conveying device;
   a bonding device arranged in the second working region and configured to bond the first panel and the second panel; and
   one second conveying device arranged in the second working region and configured to convey the first panel and the second panel to the bonding device,
   wherein the first conveying device and the second conveying device convey the first panel and the second panel to be bonded to each other as a set of the first panel and the second panel.

2. The system according to claim 1, further comprising:
   a first control device configured to control conveyance of the first conveying device,
   wherein:
   the first conveying mechanism is configured to intermittently convey a plurality of first panels in a first conveyance direction; and
   the second conveying mechanism is configured to intermittently convey a plurality of second panels in the first conveyance direction, and
   the first control device controls a conveying operation of the second conveying mechanism along with a conveying operation of the first conveying mechanism.

3. The system according to claim 1, wherein
the second conveying device comprises:
a moving unit moved along a predetermined moving path; and
a holding unit mounted on the moving unit and configured to hold the first panel and the second panel, and
a plurality of bonding devices arranged along the predetermined moving path.

4. The system according to claim 3, further comprising:
a control device configured to control conveyance of the second conveying device, and
the control device selects the bonding device which performs bonding of the first panel and the second panel being conveyed, based on a bonding situation of each of the bonding devices and causes the second conveying device to convey the set of the first panel and the second panel to the selected bonding device.

5. The system according to claim 3, further comprising:
a relay unit arranged between the first conveying device and the second conveying device and configured to temporarily hold the first panel and the second panel; and
a transfer device configured to transfer the first panel and the second panel from the first conveying device to the relay unit,
wherein the second conveying device and the holding unit take out the set of the first panel and the second panel from the relay unit and supply the set of the first panel and the second panel to one of the bonding devices.

6. The system according to claim 5, wherein the relay unit comprises a turnover mechanism configured to turn over the first panel or the second panel transferred from the transfer device.

7. The system according to claim 6, wherein
the relay unit comprises:
a first rotation mechanism configured to change an orientation of the first panel; and
a second rotation mechanism configured to change an orientation of the second panel.

8. The system according to claim 6, wherein
the bonding device comprises:
an input portion configured to receive the first panel and the second panel from the second conveying device;
a first bonding support portion configured to support the first panel;
a second bonding support portion configured to support the second panel in a state in which a bonding surface of the second panel faces that of the first panel;
a press moving mechanism configured to move the first bonding support portion or the second bonding support portion in a direction where the first panel and second panel are brought close to or away from each other, and bond the first panel and the second panel; and
an ejection portion configured to eject the first panel and the second panel which are bonded to each other.

9. The system according to claim 5, wherein
the transfer device comprises:
a second moving unit configured to move a second moving path crossing the predetermined moving path; and
a second holding unit mounted on the second moving unit and configured to hold the set of the first panel and the second panel.

10. The system according to claim 5, wherein
the relay unit comprises:
a first rotation mechanism configured to change an orientation of the first panel; and
a second rotation mechanism configured to change an orientation of the second panel.

11. The system according to claim 3, further comprising:
a transfer device configured to transfer the set of the first panel and the second panel from the first conveying device to the second conveying device; and
a turnover mechanism arranged in the second working region and configured to receive a set of the first panel and the second panel from the transfer device and turn over the first panel or the second panel.

12. The system according to claim 7, wherein
the transfer device comprises:
a second moving unit configured to move a second moving path crossing the predetermined moving path; and
a second holding unit mounted on the second moving unit and configured to hold the set of the first panel and the second panel.

13. The system according to claim 1, further comprising:
a common first support member configured to support, at respective predetermined support positions, the coating device and a supply device configured to supply the adhesive to the coating device,
wherein the coating device includes a coating head configured to discharge the adhesive,
the supply device includes:
a storage portion configured to store the adhesive; and
an adhesive supply path configured to supply the adhesive from the storage portion to the coating head, and
the first support member supports the adhesive supply path by a plurality of portions.

14. The system according to claim 13, further comprising:
a common second support member configured to support, at respective predetermined support positions, the bonding device and a decompressing device configured to evacuate a pasting working space in the bonding device,
wherein the bonding device includes a chamber portion configured to form the pasting working space,
the decompressing device includes a decompressing generator and a decompression passage configured to connect the decompressing generator and the chamber portion, and
the second support member supports the decompression passage by a plurality of portions.

* * * * *